(12) United States Patent
Jung et al.

(10) Patent No.: US 12,079,147 B2
(45) Date of Patent: *Sep. 3, 2024

(54) MEMORY DEVICE FOR EFFICIENTLY DETERMINING WHETHER TO PERFORM RE-TRAINING OPERATION AND MEMORY SYSTEM INCLUDING THE SAME

(71) Applicant: Samsung Electronics Co., Ltd., Suwon-si (KR)

(72) Inventors: Won-joo Jung, Bucheon-si (KR); Jang-woo Lee, Seoul (KR); Byung-hoon Jeong, Hwaseong-si (KR); Jeong-don Ihm, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,949

(22) Filed: Feb. 17, 2023

(65) Prior Publication Data

US 2023/0205711 A1 Jun. 29, 2023

Related U.S. Application Data

(63) Continuation of application No. 16/999,168, filed on Aug. 21, 2020, now Pat. No. 11,604,714, which is a (Continued)

(30) Foreign Application Priority Data

Aug. 9, 2017 (KR) ........................ 10-2017-0101352

(51) Int. Cl.
*G06F 12/08* (2016.01)
*G06F 1/10* (2006.01)
(Continued)

(52) U.S. Cl.
CPC ............ *G06F 13/1673* (2013.01); *G06F 1/10* (2013.01); *G06F 11/0757* (2013.01);
(Continued)

(58) Field of Classification Search
CPC ........ G06F 3/06; G06F 3/0659; G06F 3/0604; G06F 3/0632; G06F 3/0673;
(Continued)

(56) References Cited

U.S. PATENT DOCUMENTS 5,640,509 A 6/1997 Balmer et al.
7,259,606 B2 8/2007 Ku et al.
(Continued)

FOREIGN PATENT DOCUMENTS

CN 101479802 A 7/2009
CN 102194515 A 9/2011
(Continued)

OTHER PUBLICATIONS

K.-T. Wu, J.-F. Li, C.-Y. Lo, J.-S. Lai, D.-M. Kwai and Y.-F. Chou, "A channel-sharable built-in self-test scheme for multi-channel DRAMs," 2018 23rd Asia and South Pacific Design Automation Conference (ASP-DAC), Jeju, Korea (South), 2018, pp. 245-250.*
(Continued)

*Primary Examiner* — Pierre Michel Bataille
(74) *Attorney, Agent, or Firm* — Harness, Dickey & Pierce, P.L.C.

(57) ABSTRACT

A memory device includes a path state check circuit configured to check states of signal transmission paths, each signal transmission path including a data transmission path and a clock transmission path of the memory device. The path state check circuit includes a sampling circuit configured to perform a sampling operation by using pattern data that has passed through the data transmission path and a clock signal that has passed through the clock transmission
(Continued)

path, and generate sample data, and a management circuit configured to generate a comparison of the sample data with the pattern data and manage check result information indicating whether a re-training operation for the memory device is to be performed, based on a result of the comparison.

20 Claims, 30 Drawing Sheets

Related U.S. Application Data continuation-in-part of application No. 15/906,266, filed on Feb. 27, 2018, now Pat. No. 10,754,563.

(51) Int. Cl.
*G06F 11/07* (2006.01)
*G06F 11/30* (2006.01)
*G06F 12/0882* (2016.01)
*G06F 13/16* (2006.01)
*G06F 18/214* (2023.01)

(52) U.S. Cl.
CPC ...... *G06F 11/3037* (2013.01); *G06F 12/0882* (2013.01); *G06F 18/2148* (2023.01)

(58) Field of Classification Search
CPC .. G06F 13/1689; G06F 13/16; G06F 13/1673; G06F 11/0757; G06F 12/08; G06F 12/0882; G06F 11/3037
See application file for complete search history.

(56) References Cited

U.S. PATENT DOCUMENTS

| | | | |
|---|---|---|---|
| 7,447,953 B2 | 11/2008 | Vogt | |
| 7,685,393 B2 | 3/2010 | Gillingham et al. | |
| 7,692,982 B2 | 4/2010 | Yoon | |
| 7,802,166 B2 | 9/2010 | Nygren et al. | |
| 8,009,485 B2 | 8/2011 | Bae | |
| 8,045,663 B2 | 10/2011 | Bae et al. | |
| 8,300,482 B2 | 10/2012 | Bae | |
| 8,437,216 B2 | 5/2013 | Oh et al. | |
| 8,565,033 B1 | 10/2013 | Manohararajah et al. | |
| 8,593,901 B2 | 11/2013 | Oh et al. | |
| 8,619,492 B2 | 12/2013 | Jeon | |
| 8,674,999 B2 | 3/2014 | Hein | |
| 9,042,188 B2 | 5/2015 | Prakash et al. | |
| 9,218,575 B2 | 12/2015 | Mozak et al. | |
| 9,639,495 B2 | 5/2017 | Dearth et al. | |
| 10,504,598 B2* | 12/2019 | Uehara | G11C 16/32 |
| 10,504,606 B2* | 12/2019 | Kwon | G11C 29/38 |
| 11,165,554 B1* | 11/2021 | Huss | G06F 1/04 |
| 2002/0048335 A1* | 4/2002 | Saeki | H04L 25/14 |
| | | | 375/371 |
| 2005/0134306 A1* | 6/2005 | Stojanovic | H04L 25/4917 |
| | | | 326/31 |
| 2007/0234080 A1 | 10/2007 | Mackey et al. | |
| 2008/0098190 A1* | 4/2008 | Takase | G06F 12/0893 |
| | | | 711/E12.001 |
| 2009/0116311 A1 | 5/2009 | Bae | |
| 2009/0119419 A1 | 5/2009 | Bae et al. | |
| 2009/0322770 A1 | 12/2009 | Bae | |
| 2010/0228891 A1 | 9/2010 | Talbot | |
| 2010/0332921 A1 | 12/2010 | Schaefer | |
| 2011/0239063 A1* | 9/2011 | Zerbe | G06F 13/1689 |
| | | | 714/719 |
| 2013/0346685 A1* | 12/2013 | Hampel | G11C 7/1066 |
| | | | 711/105 |
| 2014/0189456 A1 | 7/2014 | Loh et al. | |
| 2014/0293718 A1 | 10/2014 | Prakash et al. | |
| 2014/0355359 A1 | 12/2014 | Linam et al. | |
| 2015/0066819 A1 | 3/2015 | Mozak et al. | |
| 2015/0206867 A1 | 7/2015 | Lim et al. | |
| 2015/0286408 A1 | 10/2015 | Hampel et al. | |
| 2016/0147451 A1* | 5/2016 | Derby | G06F 16/2456 |
| | | | 711/216 |
| 2016/0180898 A1 | 6/2016 | Hwang et al. | |
| 2017/0090775 A1 | 3/2017 | Kowles | |
| 2017/0220943 A1 | 8/2017 | Duncan et al. | |
| 2018/0130739 A1 | 5/2018 | Miura et al. | |
| 2019/0004984 A1* | 1/2019 | Lee | G06F 13/126 |
| 2019/0095275 A1 | 3/2019 | Dusija et al. | |
| 2019/0205244 A1* | 7/2019 | Smith | G06F 3/065 |
| 2019/0354431 A1 | 11/2019 | Lee et al. | |

FOREIGN PATENT DOCUMENTS

| | | | | |
|---|---|---|---|---|
| CN | 105706069 A | 6/2016 | | |
| CN | 106133710 A | 11/2016 | | |
| KR | 100821584 B1 | 4/2008 | | |
| WO | WO-2005050448 A2 * | 6/2005 | | G06F 11/1004 |

OTHER PUBLICATIONS

D. Resnick, "Embedded test for a new memory-card architecture," 2004 International Conferce on Test, Charlotte, NC, USA, 2004, pp. 875-882.*

Singaporean Written Opinion dated Jul. 4, 2019 issued in corresponding Singaporean Application No. 10201806103W.

Moon, T. et al. "Multi-channel Testing Architecture for High-speed Eye-diagram Using Pin Electronics and Subsampling Monobit Reconstruction Algorithms." 2014 IEEE 32nd VLSI Test Symposium (VTS), Napa, CA, 2014, pp. 1-6.

Fang, Y. et al. "Low-Power Signal Integrity Trainings for Multi-Clock Source-Synchronous Memory Systems." 2013 IEEE International SOC Conference, 2013, pp. 319-324.

Akesson, B. et al. "Automatic Generation of Efficient Predictable Memory Patterns." 2011 IEEE 17th International Conference on Embedded and Real-Time Computing Systems and Applications, 2011, pp. 177-184.

Sharma, A. "Static Random Access Memory Technologies," in Advanced Semiconductor Memories: Architectures, Designs, and Applications , IEEE, 2003, pp. 19-127,.ch 2.

Office Action dated Mar. 24, 2023, issued in corresponding Chinese Patent Application No. 201810641833.4.

* cited by examiner

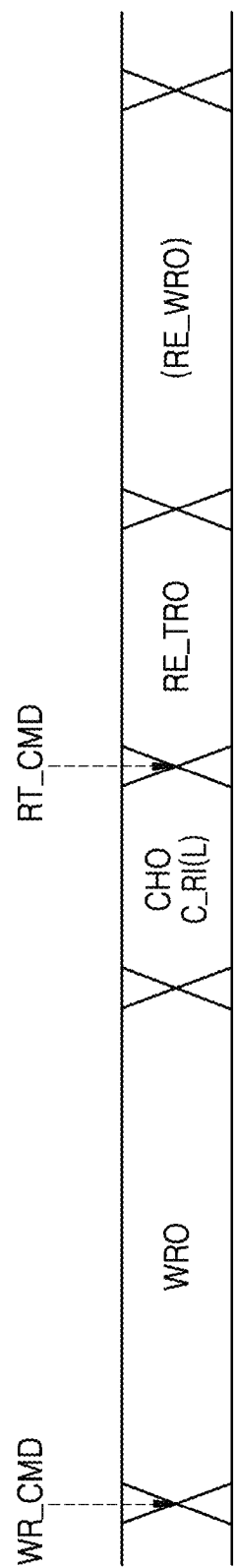

FIG. 18A                        500a
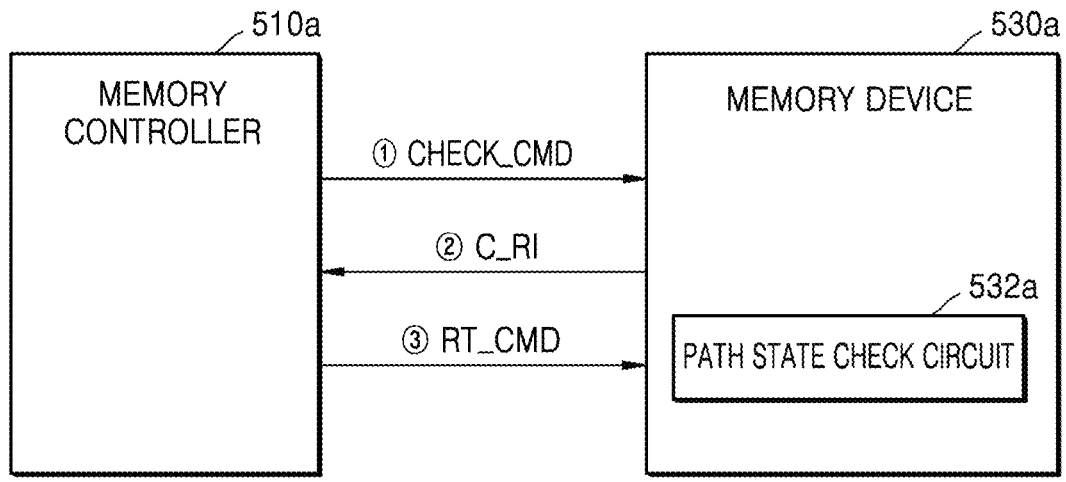
FIG. 18B                        500b
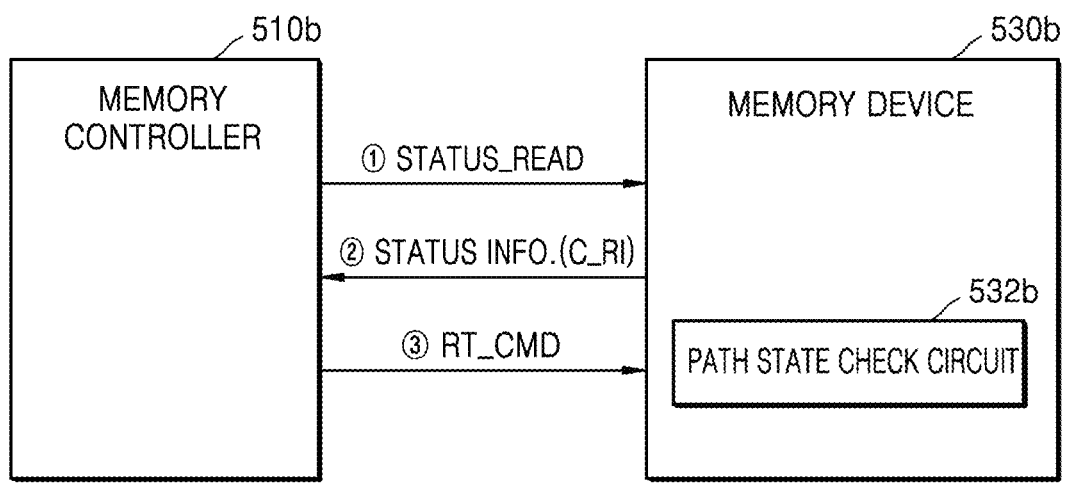

MEMORY DEVICE FOR EFFICIENTLY DETERMINING WHETHER TO PERFORM RE-TRAINING OPERATION AND MEMORY SYSTEM INCLUDING THE SAME

CROSS-REFERENCE TO RELATED APPLICATION

This application is a continuation of U.S. patent application Ser. No. 16/999,168, filed on Aug. 21, 2020, and granted as U.S. Pat. No. 11,604,714, which is a continuation-in-part of U.S. patent application Ser. No. 15/906,266, filed on Feb. 27, 2018, and granted as U.S. Pat. No. 10,754,563, which claims the benefit of Korean Patent Application No. 10-2017-0101352, filed on Aug. 9, 2017, in the Korean Intellectual Property Office, the disclosure of each of which is incorporated herein in its entirety by reference.

BACKGROUND

Example embodiments of inventive concepts relate to a memory device, and more particularly, to a memory device, which determines, or efficiently determines, whether to perform a re-training operation to cause alignment between data and a clock signal after performing a training operation on the memory device, and a memory system including the memory device.

A memory controller may perform a training operation on a memory device after power-on to adjust an alignment condition, e.g. an improved and/or optimal alignment condition between data and a clock signal and then may control a memory operation such as a write operation and a read operation. When a specific (or, alternatively, predetermined) time passes after the training operation, a skew or a misalignment may occur between data and a clock signal due to a variation due to a memory operating environment or the like, and thus a write operation or a read operation may fail. Thus, a re-training operation may be performed on the memory device aligning the data with the clock signal. In order to perform the re-training operation, the memory controller may determine whether a memory operation fails, determine whether to perform the re-training operation based on the determination result, and control a re-training operation for the memory device.

However, when the memory controller performs operations, such as determining whether a memory operation fails and determining whether to perform the re-training operation, loss of time and memory performance deterioration due to the loss of time may occur.

SUMMARY

Example embodiments of inventive concepts provide a memory device, which may efficiently determine whether to perform a re-training operation to improve performance of a memory system, and a memory system including the memory device.

According to an example embodiment of inventive concepts, there is provided a memory device, including a path state check circuit configured to check states of signal transmission paths, each signal transmission path including a data transmission path and a clock transmission path of the memory device. The path state check circuit includes a sampling circuit configured to perform a sampling operation by using pattern data that has passed through the data transmission path and a clock signal that has passed through the clock transmission path, and generate sample data, and a management circuit configured to generate a comparison of the sample data with the pattern data and manage check result information indicating whether a re-training operation for the memory device is to be performed, based on a result of the comparison.

According to an example embodiment of inventive concepts, there is provided a memory device, including a path state check circuit configured to check states of signal transmission paths, each signal transmission path including a data transmission path and a clock transmission path of the memory device. The path state check circuit includes a sampling circuit configured to perform a plurality of sampling operations by using pattern data that has passed through the data transmission path and a plurality of clock signals that have passed through the clock transmission path, each of the plurality of clock signals having different phases, the sampling circuit configured to generate a plurality of pieces of sample data a management circuit configured to generate a comparison of the pattern data with the plurality of pieces of sample data, and configured to manage path state information indicating degree of alignment between the pattern data and a reference clock signal among the plurality of clock signals, based on results of the comparison.

According to an example embodiment of inventive concepts, there is provided a memory system, including a memory device, and a memory controller configured to control a memory operation of the memory device, wherein the memory device is configured to perform an operation of checking a state of a signal transmission path by using pattern data and a clock signal which have respectively passed through the signal transmission path, and to generate check result information indicating whether to perform a re-training operation for the memory device is to be performed, as a result of performing the operation, wherein the memory controller is configured to control the re-training operation for the memory device based on the check result information.

According to an example embodiment of inventive concepts, there is provided a storage device including a plurality of slaves, each comprising a signal transmission path for storing specific data, and a master configured to control operations of the plurality of slaves. Each of the slaves is configured to generate a comparison of sample data, generated by performing a sampling operation by using pattern data and a clock signal which have respectively passed through the signal transmission path, with the pattern data, and generate check result information indicating whether a re-training operation is required, based on a result of the comparison, and provide the generated check result information to the master, and the master is configured to control a re-training operation for the slaves based on a plurality of pieces of check result information received from the slaves.

BRIEF DESCRIPTION OF THE DRAWINGS

Embodiments of the inventive concept will be more clearly understood from the following detailed description taken in conjunction with the accompanying drawings in which:

FIGS. 16A to 16C are timing diagrams for explaining an operation of a memory device which is based on check result information generated by a path state check circuit according to an example embodiment of the inventive concept;

FIGS. 18A and 18B are block diagrams of memory systems for explaining embodiments in which a memory controller receives check result information from a memory device;

DETAILED DESCRIPTION OF THE EMBODIMENTS

Hereinafter, embodiments of inventive concepts will be described in detail with reference to the accompanying drawings.

Figure 1:
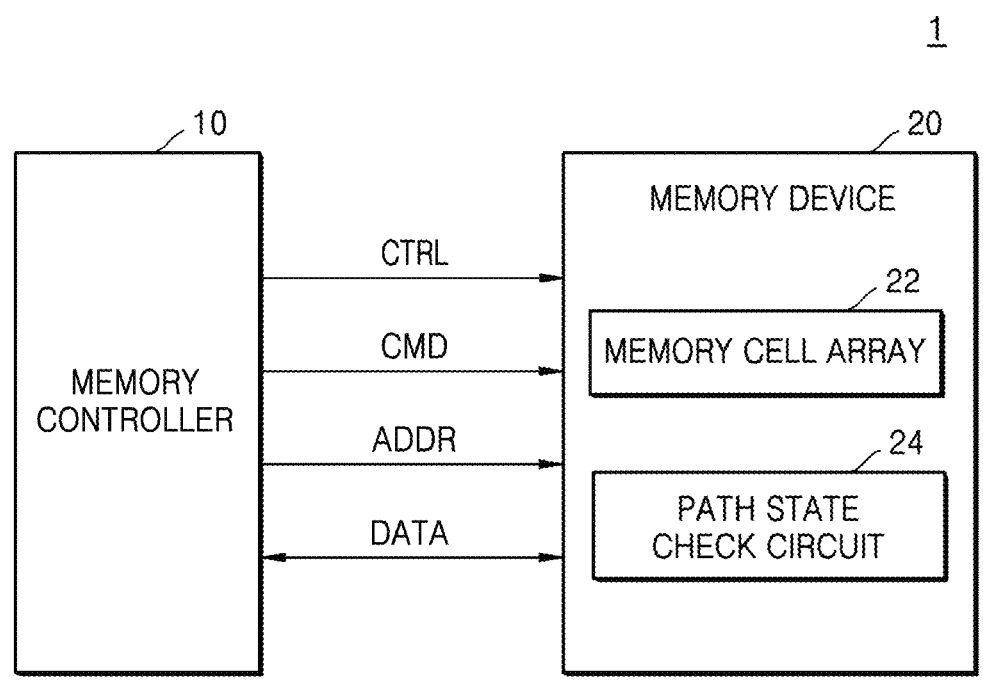
FIG. 1 is a schematic block diagram of a memory system according to an example embodiment of the inventive concept.

FIG. 1 is a schematic block diagram of a memory system 1 according to an embodiment of inventive concepts.

Referring to FIG. 1, the memory system 1 may include a memory controller 10 and a memory device 20. The memory device 20 may include a memory cell array 22 and a path state check circuit 24. However, inventive concepts is not limited thereto. The path state check circuit 24 may be or may include a hardware block including an analog circuit and/or a digital circuit. The hardware block may include a plurality of electronic components, such as resistors, transistors, capacitors, and/or other elements arranged and connected to one another such that the hardware block is capable of performing a specific function, in response to electrical stimulus. Alternatively or additionally, the path state check circuit 24 may be or may include a software block including a plurality of machine-readable instructions configured to be executed by the memory controller 10 and/or the like. The software block may comprise an ordered list of machine-readable instructions that implement logical functions. The software block may be embodied in any processor-readable medium, for use by or in connection with an instruction execution system, apparatus, or device, such as a single or multiple-core processor or processor-containing system. Hereinafter, as an example embodiment, components of the memory system 1 shown in FIG. 1 will be described in detail.

The memory controller 10 may perform a control operation on the memory device 20. For example, the memory controller 10 may provide an address signal ADDR, a command CMD, and a control signal CTRL to the memory device 20 to perform write, read, and/or erase operations on the memory device 20. The memory cell array 22 may include a plurality of memory cells (not shown) arranged in areas where a plurality of word lines (not shown) intersect a plurality of bit lines (not shown). Furthermore, the memory cell array 22 may include word lines, at least one string select line, and at least one ground select line, and may include a plurality of memory blocks.

In an example embodiment, the plurality of memory cells may be flash memory cells and the memory cell array 22 may be or may include a NAND flash memory cell array and/or a NOR flash memory cell array. Hereinafter, embodiments of inventive concepts will be described in detail with reference to a case where the plurality of memory cells are flash memory cells. However, inventive concepts are not limited thereto, and in other embodiments, the plurality of memory cells may be resistive memory cells such as resistive random access memory (RRAM), phase change RAM (PRAM), and/or magnetic RAM (MRAM), or may be volatile memory cells such as dynamic RAM (DRAM).

The path state check circuit 24 according to an example embodiment of inventive concepts may check states of signal transmission paths in the memory device 20 and generate check result information. The check result information may be or may include information to be referred to when the memory controller 10 controls a re-training operation for the memory device 20. The path state check circuit 24 may provide the check result information to the memory controller 10, and the memory controller 10 may determine, e.g. quickly determine, whether or not to perform a re-training operation on the memory device 20 by referring to the check result information without separately determining whether a memory operation of the memory device 20 fails.

In an example embodiment, the path state check circuit 24 may check an alignment state between pattern data that has passed through a specific (or, alternatively, predetermined) data transmission path in the memory device 20 and a clock signal that has passed through a specific (or, alternatively, predetermined) clock transmission path in the memory device 20, and may generate check result information indicating whether a re-training operation for the memory device 20 is required. For example, when receiving a command related to a signal transmission path state check from the memory controller 10 or receiving an address signal having a specific value, or after a training operation of the memory device 20, the path state check circuit 24 may perform an operation of checking a state of a signal transmission path and generating check result information, every specific (or, alternatively, predetermined) period.

The pattern data may be data including specific (or, alternatively, predetermined) pattern bits to check a state of a data transmission path. The specific (or, alternatively, predetermined) data transmission path may correspond to a data transmission path through which general data written to the memory cell array 22 passes, and the specific (or, alternatively, predetermined) clock transmission path may correspond to a clock transmission path through which a clock signal necessary for writing general data to the memory cell array 22 passes. The signal transmission path may include a data transmission path and a clock transmission path, and the details of the data transmission path and the clock transmission path which are checked by the path state check circuit 24 is described below.

The path state check circuit 24 according to an example embodiment may check a state of a signal transmission path and generate check result information indicating whether or not a re-training operation is required, or specified, for the memory device 20 and provide the check result information to the memory controller 10, and thus, the memory controller 10 may quickly determine whether to perform a re-training operation on the memory device 20 and perform the re-training operation. As described above, the performance of the memory system 1 may be improved by determining, e.g. efficiently determining, whether to perform the re-training operation.

Figure 2:
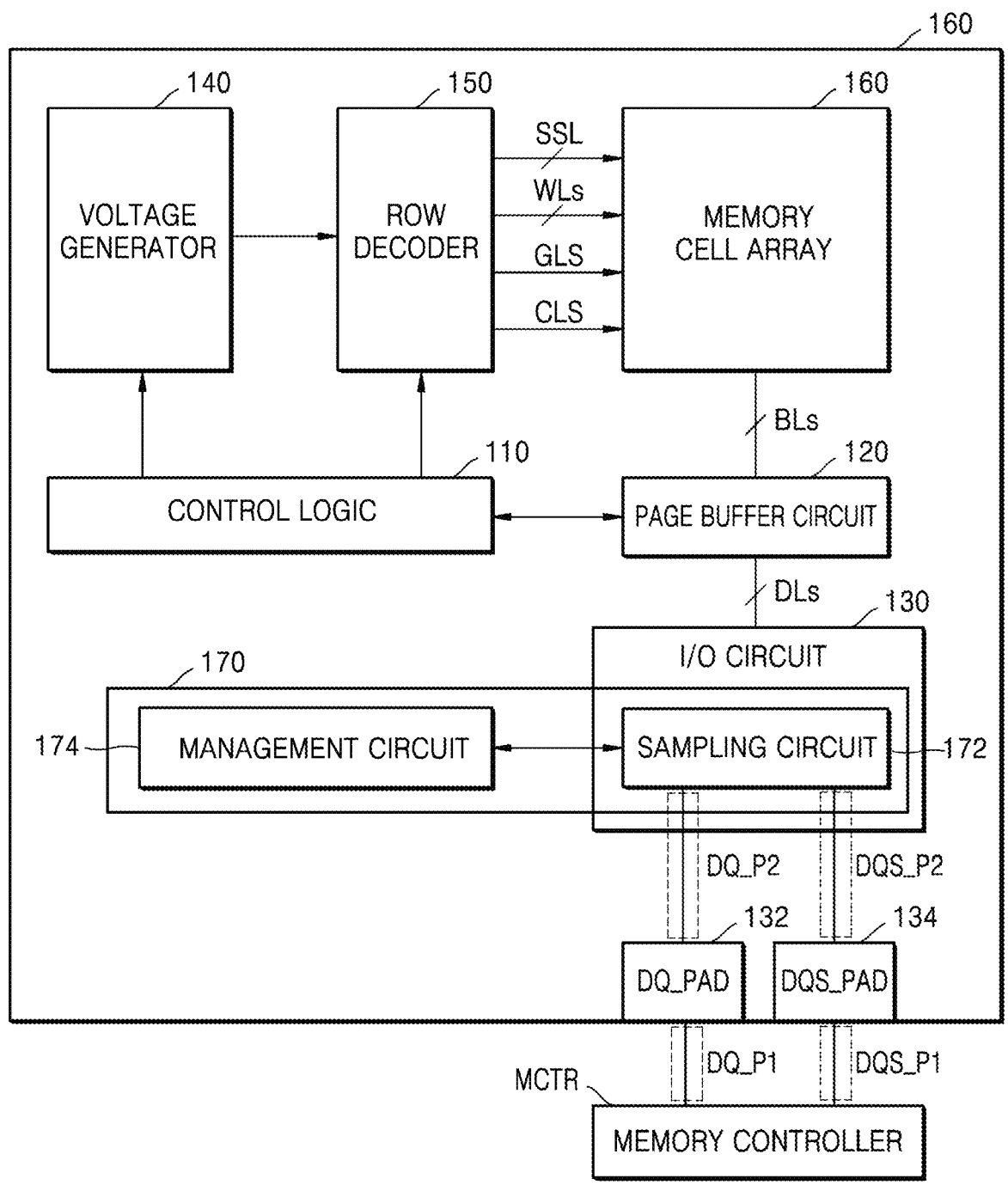
FIG. 2 is a block diagram of a memory device in the memory system of FIG. 1.

FIG. 2 is a block diagram of the memory device 20 in the memory system 1 of FIG. 1.

Referring to FIG. 2, a memory device 100 corresponding to the memory device 20 may include a control logic 110, a page buffer circuit 120, an input/output (I/O) circuit 130, a voltage generator 140, a row decoder 150, a memory cell array 160, and/or a path state check circuit 170.

The memory cell array 160 may be connected to the row decoder 150 through word lines WLs, a string select line SSL, and a ground select line GSL, and may be connected to the page buffer circuit 120 through bit lines BLs. The memory cell array 160 may include a plurality of memory blocks. The memory cell array 160 may include a plurality of NAND cell strings. Each of the NAND cell strings may form a channel in a vertical or horizontal direction. In the memory cell array 160, a plurality of word lines may be stacked in the vertical direction. However, inventive concepts are not limited thereto.

The row decoder 150 may decode an address to select any one of the word lines WLs of the memory cell array 160. The row decoder 150 may provide a word line voltage provided from the voltage generator 140 to a selected word line of the memory cell array 160.

The page buffer circuit 120 may operate as a write driver or a sense amplifier in accordance with operations performed by the control logic 110. The page buffer circuit 120 may write data, received through data lines DLs from the I/O circuit 130 during a write operation, in selected memory cells, and may sense data, stored in selected memory cells, through the bit lines BLs during a read operation to provide sensed data to the I/O circuit 130.

The I/O circuit 130 may be connected to the page buffer circuit 120 through the data lines DLs, and may be connected to a memory controller MCTR through a DQ pad 132 and a DQS pad 134. The I/O circuit 130 may receive or output data (DQ) from or to the memory controller MCTR through the DQ pad 132 and may receive or output a DQ strobe signal from or to the memory controller MCTR through the DQS pad 134. A clock signal used in a memory operation may be generated from the DQ strobe signal. Although one DQ pad 132 is shown in FIG. 2 for the convenience of description, inventive concepts is not limited thereto, and the memory device 100 may include a plurality of DQ pads and may receive or output a plurality of pieces of data in parallel through the plurality of DQ pads. The I/O circuit 130 may provide an input address or command to the control logic 110 or the row decoder 150.

The control logic 110 may control a memory operation including a training operation for aligning data with a clock signal, a re-training operation to be performed when the data and the clock signal are misaligned with each other after the training operation, a write operation, a read operation, and/or an erase operation, in response to a command transmitted from the I/O circuit 130.

The path state check circuit 170 may include a sampling circuit 172 and a management circuit 174. The sampling circuit 172 may be included in the I/O circuit 130 and used when writing data to the page buffer circuit 120 and/or the memory cell array 160. The path state check circuit 170 may check an alignment state between pattern data that has passed through a specific (or, alternatively, predetermined) data transmission path in the memory device 100 and a clock signal that has passed through a specific (or, alternatively, predetermined) clock transmission path in the memory device 100. The specific (or, alternatively, predetermined) data transmission path may be a part of or the whole transmission path of write data in a normal write operation, and the specific (or, alternatively, predetermined) clock transmission path may be a part of or the whole transmission path of a clock signal required in the normal write operation.

The specific (or, alternatively, predetermined) data transmission path may include a first data transmission path DQ_P1 between the memory controller MCTR and the DQ pad 132 and a second data transmission path DQ_P2 between the DQ pad 132 and the sampling circuit 172. The specific (or, alternatively, predetermined) clock transmission path may include a first clock transmission path DQS_P1 between the memory controller MCTR and the DQS pad 134 and a second clock transmission path DQS_P2 between the DQS pad 134 and the sampling circuit 172. However, inventive concepts is not limited thereto, and each of the specific (or, alternatively, predetermined) data transmission path and the specific (or, alternatively, predetermined) clock transmission path may be set so as to further include a path of a block which is in the I/O circuit 130 and performs a high-speed operation above a reference frequency. Furthermore, the specific (or, alternatively, predetermined) data transmission path and the specific (or, alternatively, predetermined) clock transmission path may correspond to a replica signal transmission path that is the same as or similar to a signal transmission path of data and a clock signal when performing a write operation. A specific operation of the path state check circuit 170 will be described below.

Figure 3A:
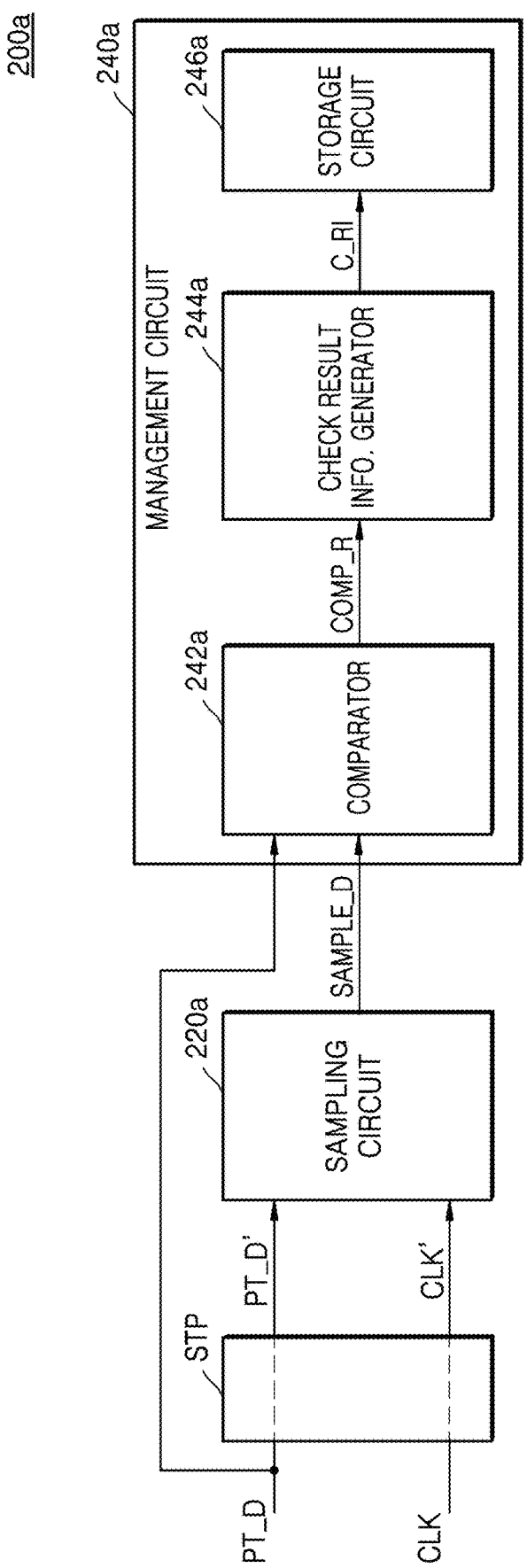
FIGS. 3A and 3B are block diagrams of a path state check circuit of FIG. 2.
Figure 3B:
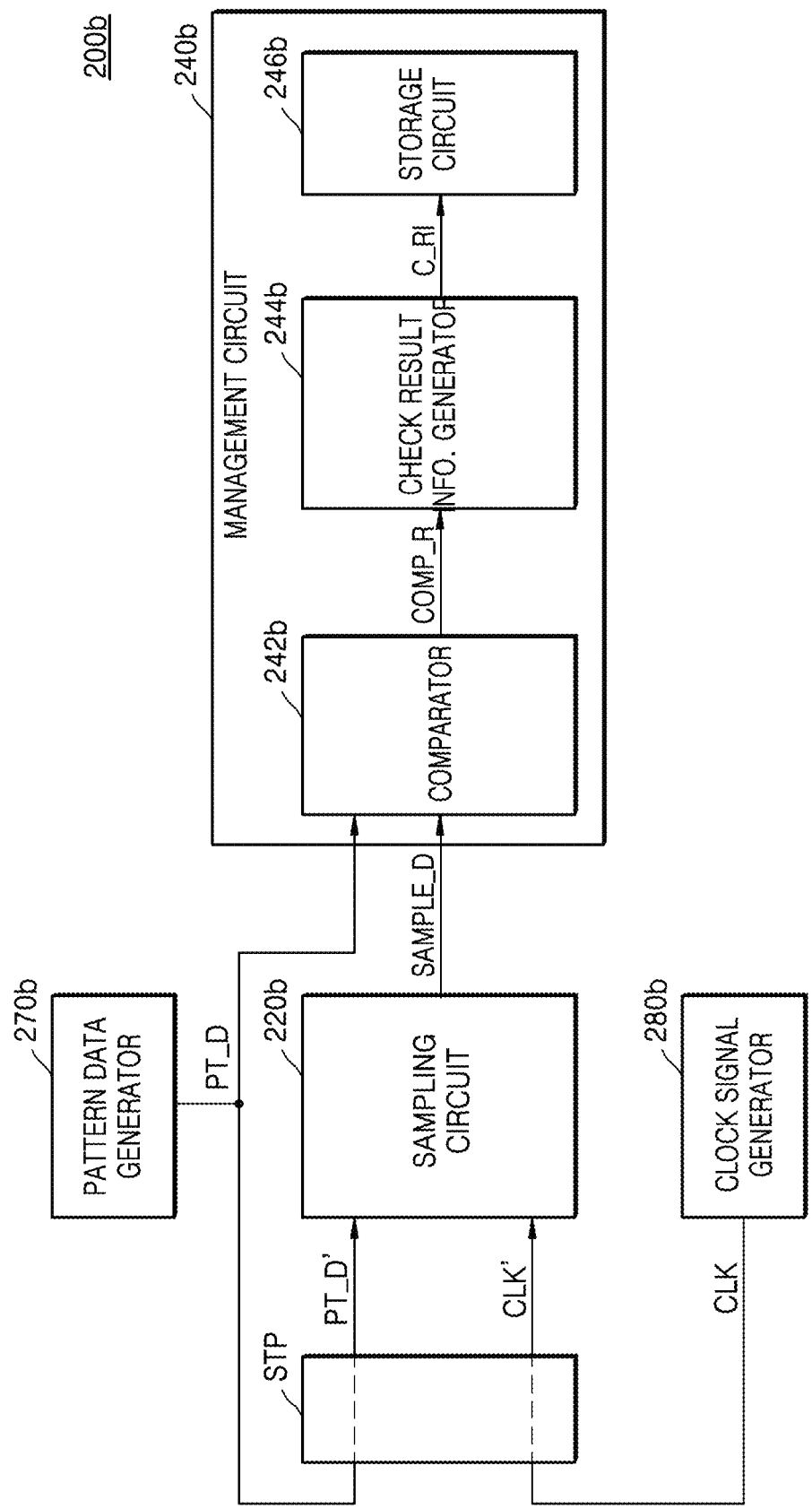

FIGS. 3A and 3B are block diagrams of the path state check circuit 170 of FIG. 2.

Referring to FIG. 3A, a path state check circuit 200a corresponding to the path state check circuit 170 may include a sampling circuit 220a and a management circuit 240a. The management circuit 240a may include a comparator 242a, a check result information generator 244a, and a storage circuit 246a. The path state check circuit 200a may use pattern data PT_D' and a clock signal CLK', which have passed (or have undergone) a signal transmission path STP, to check a state of the signal transmission path STP. As non-limiting example embodiment, pattern data PT_D and a clock signal CLK may be received from the memory controller 10 in FIG. 1. The sampling circuit 220a may perform a sampling operation by using the pattern data PT_D' and the clock signal CLK' and generate sample data Sample_D. For example, the sampling circuit 220a may sample a value of the pattern data PT_D' at a rising edge and/or a falling edge of the clock signal CLK' to generate the sample data Sample_D.

The comparator 242a may receive the sample data Sample_D from the sampling circuit 220a and may receive the pattern data PT_D as a comparison reference. The comparator 242a may compare the pattern data PT_D with the sample data Sample_D to generate a comparison result Comp_R. The check result information generator 244a may receive the comparison result Comp_R from the comparator 242a and may generate check result information C_RI indicating whether a re-training operation for the memory device is to be performed, based on the comparison result Comp_R.

The storage circuit 246a may receive the check result information C_RI from the check result information generator 244a and store the received check result information C_RI. The storage circuit 246a may include at least one register and may store the check result information C_RI in a status register indicating a status of the memory device. For example, when the storage circuit 246a receives check result information C_RI having a first value indicating that a re-training operation for the memory device is not required, the storage circuit 246a may store the check result information C_RI having the first value in a specific (or, alternatively, predetermined) register. Thereafter, when the storage circuit 246a receives check result information C_RI having a second value indicating that a re-training operation for the memory device is required, the storage circuit 246a may change the first value of the check result information C_RI stored in the specific (or, alternatively, predetermined) register to the second value. As such, the management circuit 240a may manage the check result information C_RI stored in the storage circuit 246a, and although not shown in FIG. 3A, the check result information C_RI may be provided to the memory controller 10 of FIG. 1 and the memory controller 10 may determine, e.g. easily determine, whether a re-training operation for the memory device is required, e.g. is to be performed, through the check result information C_RI.

A path state check circuit 200b of FIG. 3B may further include a pattern data generator 270b and a clock signal generator 280b as compared with the path state check circuit 200a of FIG. 3A. The pattern data generator 270b may generate pattern data PT_D including specific (or, alternatively, predetermined) pattern bits to check a state of a signal transmission path STP. The pattern data generator 270b may generate pattern data PT_D that randomly includes specific (or, alternatively, predetermined) pattern bits. The pattern data generator 270b may include an E-fuse circuit storing various pattern data and may select any one of various pattern data stored in the E-fuse circuit and generate pattern data PT_D.

The clock signal generator 280b may generate a clock signal CLK having a specific (or, alternatively, predetermined) frequency, to check the state of the signal transmission path STP. The clock signal generator 280b may generate the clock signal CLK based on the DQ strobe signal received from the memory controller 10. The clock signal generator 280b may generate a clock signal having a frequency that is the same as the frequency of a clock signal used in, e.g. required in, a write operation. The path state check circuit 200a of FIG. 3A receives the pattern data PT_D and the clock signal CLK from the outside, whereas the path state check circuit 200b of FIG. 3B may internally generate the pattern data PT_D and the clock signal CLK. Therefore, after a training operation for the memory device, the path state check circuit 200b may actively check a state of a signal transmission path without receiving a separate signal from the memory controller 10.

Figure 4:
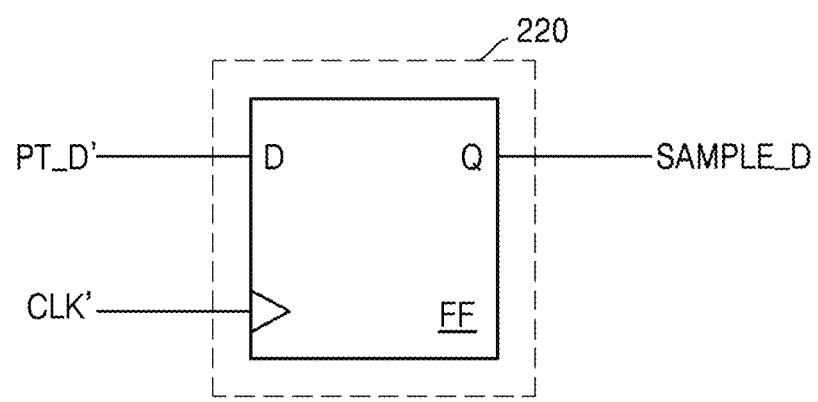
FIG. 4 is a circuit diagram of a sampling circuit of FIG. 3A.

FIG. 4 is a circuit diagram of the sampling circuit 220a of FIG. 3A.

Referring to FIG. 4, a sampling circuit 220 corresponding to the sampling circuit 220a may include at least one flip-flop FF. The flip-flop FF may receive pattern data PT_D' and the clock signal CLK' that have passed through a signal transmission path. The flip-flop FF may sample a value of the pattern data PT_D' at a rising edge and a falling edge of the clock signal CLK' to generate sample data Sample_D and output the sample data Sample_D. However, inventive concepts are not limited thereto, and the sampling circuit 220a may include various structures capable of sampling the pattern data PT_D' based on the clock signal CLK'.

Figure 5A:
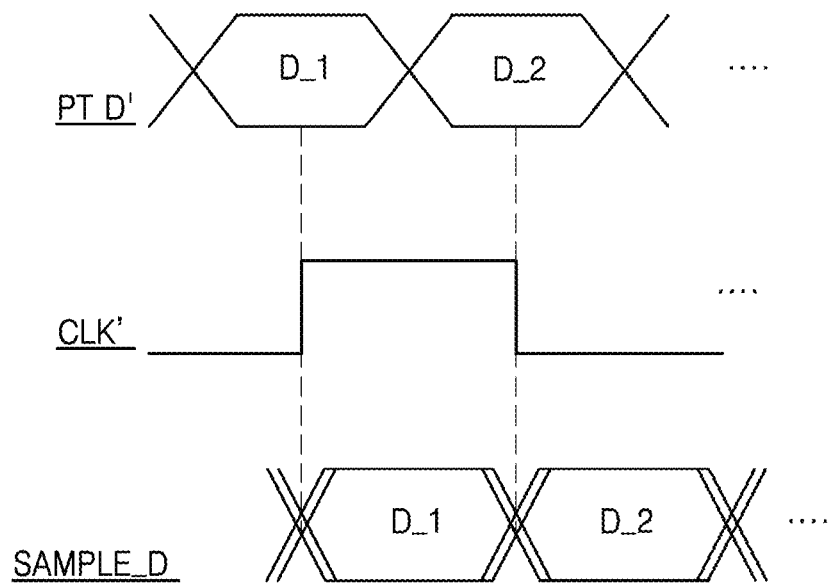
FIGS. 5A and 5B are diagrams for explaining a sampling operation of the sampling circuit of FIG. 3A.
Figure 5B:
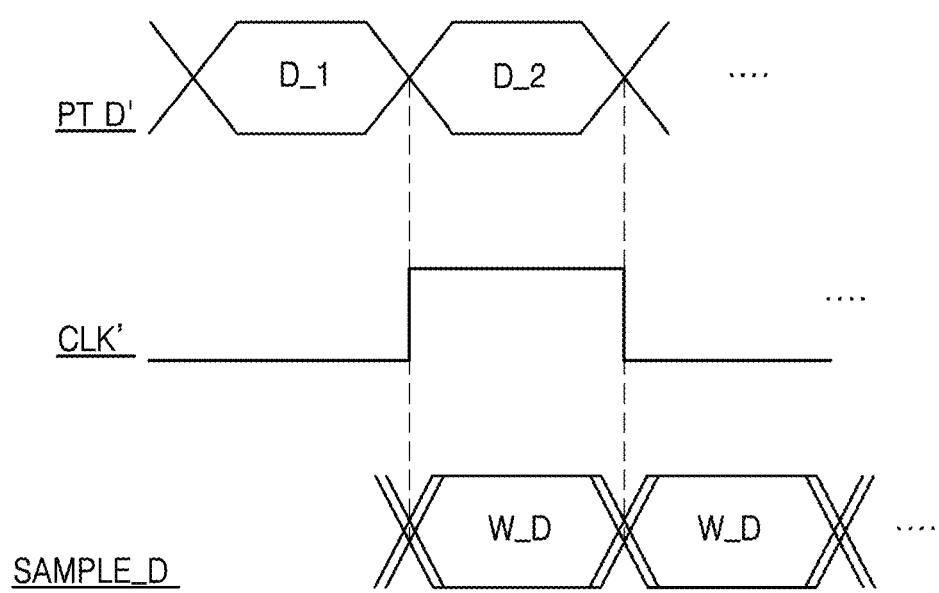

FIGS. 5A and 5B are diagrams for explaining a sampling operation of the sampling circuit 220a of FIG. 3A.

In FIG. 5A, a sampling operation is assumed to be performed in a state where a signal transmission path state is good and alignment between the pattern data PT_D' and the clock signal CLK' is correct.

Referring to FIGS. 3A and 5A, the sampling circuit 220a may perform a sampling operation on the pattern data PT_D' including first bit data D_1 and second bit data D_2. For example, the sampling circuit 220a may sample a value of the pattern data PT_D' at a rising edge and a falling edge of the clock signal CLK'. For example, the first bit data D_1 may be sampled at a rising edge of the clock signal CLK' and the second bit data D_2 may be sampled at a falling edge of the clock signal CLK'. Thus, the sampling circuit 220a may generate sample data Sample_D including the first bit data D_1 and the second bit data D_2.

In FIG. 5B, a sampling operation is assumed to be performed in a state where a signal transmission path state is bad and alignment between the pattern data PT_D' and the clock signal CLK' is not correct.

Referring to FIGS. 3A and 5B, the sampling circuit 220a may perform a sampling operation on the pattern data PT_D' including the first bit data D_1 and the second bit data D_2. For example, the sampling circuit 220a may sample the pattern data PT_D' at a rising edge and a falling edge of the clock signal CLK', respectively, and generate sample data Sample_D including data W_D different from the first bit data D_1 and another data W_D different from the second bit data D_2. However, inventive concepts is not limited thereto, and the sampling operation may be performed in various ways using pattern data including more pattern bits.

Figure 6A:
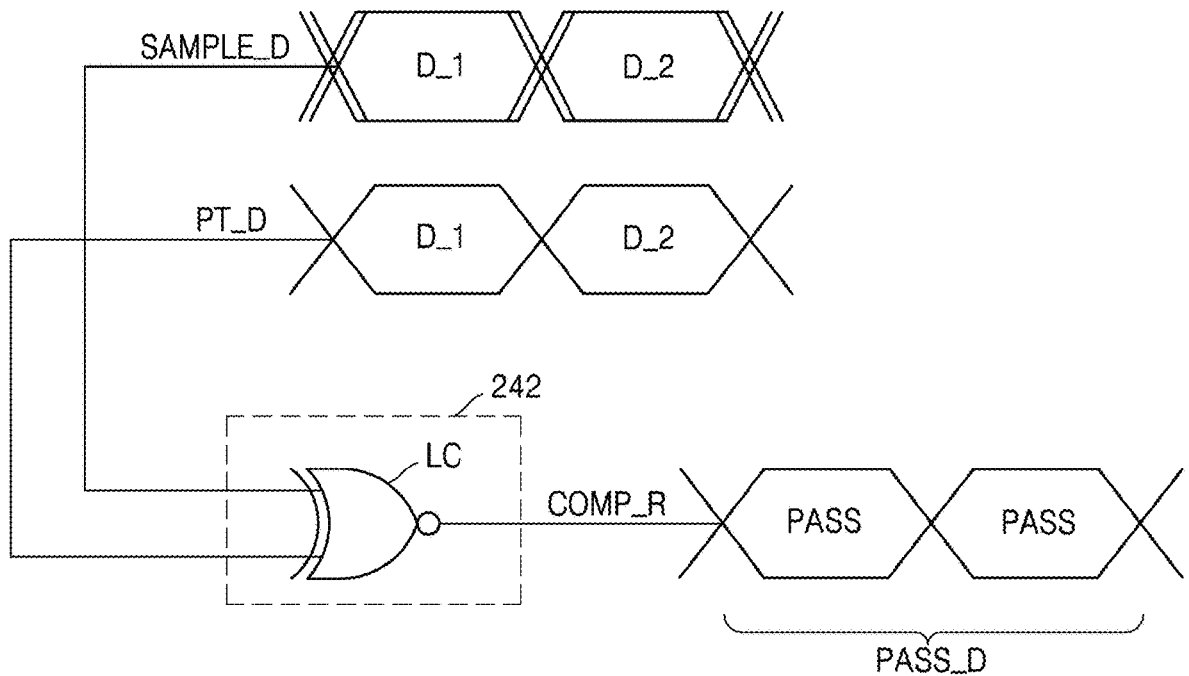
FIGS. 6A and 6B are diagrams for explaining a comparison operation of a comparator according to an example embodiment of the inventive concept.
Figure 6B:
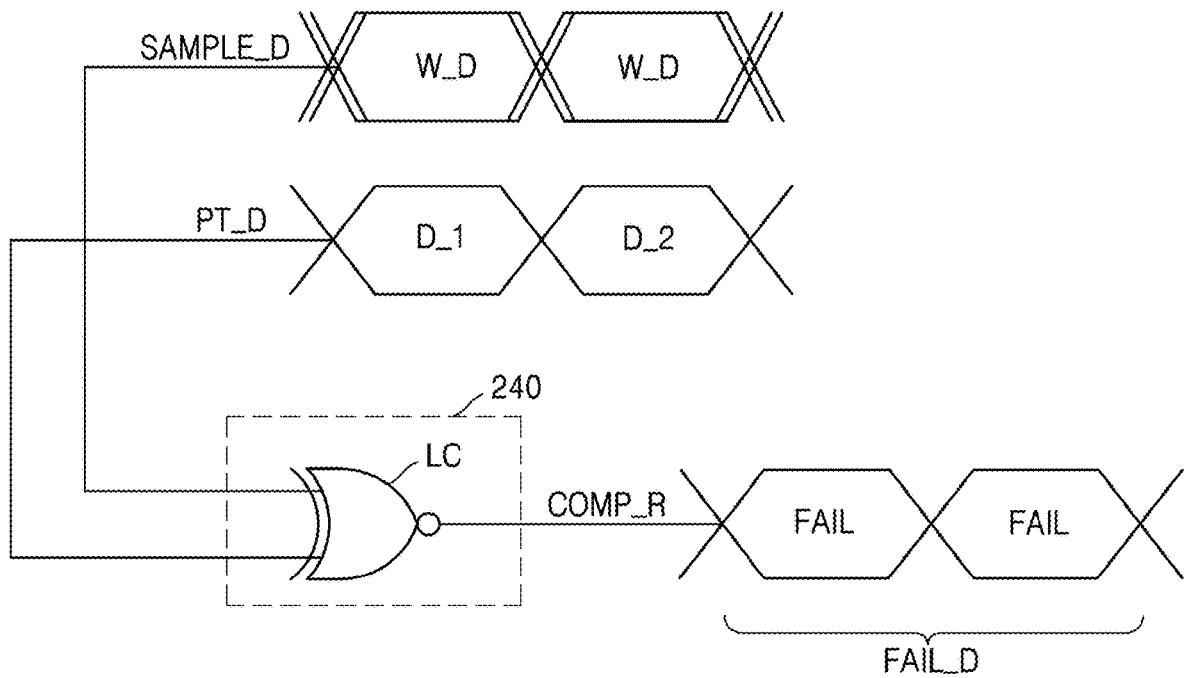

FIGS. 6A and 6B are diagrams for explaining a comparison operation of a comparator 242 according to an example embodiment of inventive concepts.

FIG. 6A is a diagram showing a case of comparing the sample data Sample_D in FIG. 5A with pattern data PT_D, and FIG. 6B is a diagram showing a case of comparing the sample data Sample_D in FIG. 5B with pattern data PT_D.

Referring to FIG. 6A, the comparator 242 may include at least one logic circuit LC, and for example, the logic circuit LC may be or may include an XOR logic circuit. The logic circuit LC may receive the sample data Sample_D and the pattern data PT_D as a comparison reference and compare the sample data Sample_D with the pattern data PT_D. The pattern data PT_D and the sample data Sample_D may include first bit data D_1 and second bit data D_2, respectively. The comparator 242 may compare the sample data Sample_D with the pattern data PT_D and generate path data Pass_D, which indicates that the pattern data PT_D matches the sample data Sample_D, as a comparison result Comp_R.

Referring to FIG. 6B, the logic circuit LC of the comparator 242 may receive the sample data Sample_D and the pattern data PT_D and compare the sample data Sample_D with the pattern data PT_D. The sample data Sample_D may include data W_D different from first bit data D_1 and another data W_D different from second bit data D_2. The comparator 242 may compare the sample data Sample_D with the pattern data PT_D and generate fail data Fail_D, which indicates that the pattern data PT_D and the sample data Sample_D are different from each other, as a comparison result Comp_R.

Figure 7:
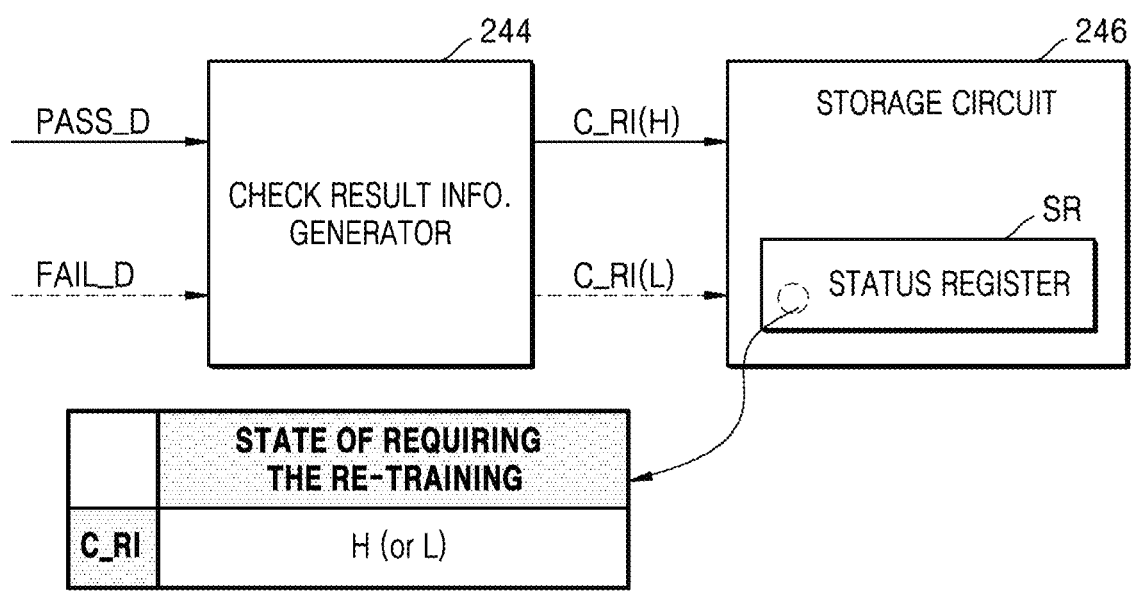
FIG. 7 is a diagram for explaining an operation of generating check result information by a check result information generator according to an example embodiment of the inventive concept.

FIG. 7 is a diagram for explaining an operation of generating check result information C_RI by a check result information generator 244 according to an example embodiment of inventive concepts.

Referring to FIG. 7, when the check result information generator 244 receives pass data Pass_D indicating that sample data matches pattern data, the check result information generator 244 may generate check result information C_RI having a first value (e.g. logic high H) indicating that a re-training operation for a memory device is not required. In addition, when the check result information generator 244 receives fail data Fail_D indicating that sample data does not match pattern data, the check result information generator 244 may generate check result information C_RI having a second value (e.g. logic low L) indicating that a re-training operation for a memory device is required.

The check result information generator 244 may store the check result information C_RI in a storage circuit 246. In an example embodiment, the storage circuit 246 may include a status register SR in which information indicating a status of a memory device is stored. The status register SR may include a specific (or, alternatively, predetermined) memory space for storing a value of the check result information C_RI. When receiving a status read from a memory controller (or the outside), the storage circuit 246 may provide the memory controller (or the outside) with memory status information including check result information C_RI indicating whether a re-training operation for the memory device is required.

Figure 8:
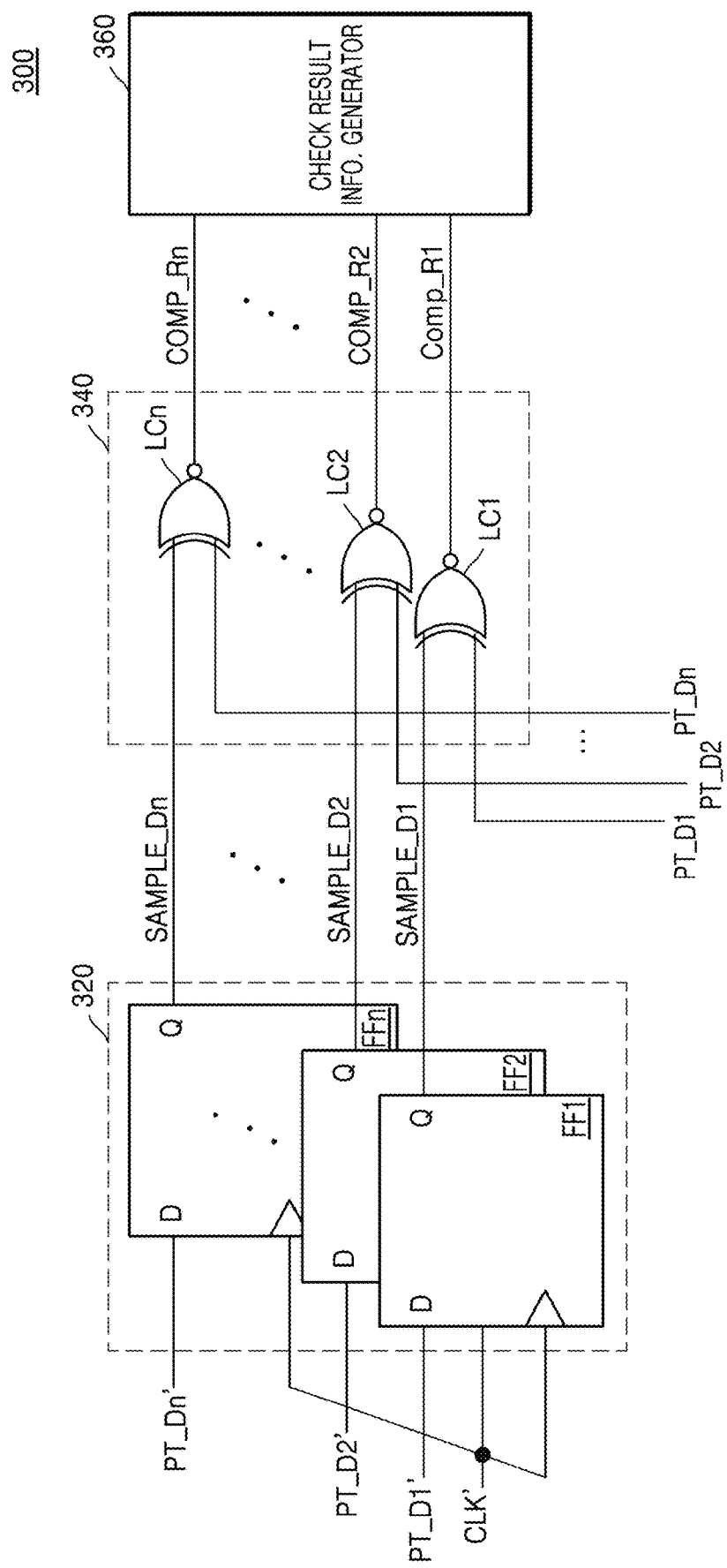
FIG. 8 is a block diagram of a path state check circuit according to an example embodiment of the inventive concept.

FIG. 8 is a block diagram of a path state check circuit 300 according to an example embodiment of inventive concepts.

FIG. 8 illustrates an operation of the path state check circuit 300 when a plurality of pieces of parallel data are transmitted and received in parallel between a memory controller and a memory device. In this case, that the plurality of pieces of parallel data respectively are assumed to pass through different data transmission paths in the memory device 100 of FIG. 2.

Referring to FIG. 8, the path state check circuit 300 may include a sampling circuit 320, a comparator 340, and a check result information generator 360. The sampling circuit 320 may include a plurality of flip-flops FF1 to FFn. First to n-th pieces of pattern data PT_D1 to PT_Dn may correspond to first to nth pieces of parallel data, respectively. In more detail, in order to check states of data transmission paths through which a plurality of pieces of parallel data are transmitted, a plurality of pieces of pattern data, i.e., the first to n-th pieces of pattern data PT_1 to PT_n, may respectively pass through specific (or, alternatively, predetermined) data transmission paths corresponding to the data transmission paths through which the plurality of pieces of parallel data are transmitted when the memory device performs a write operation.

Each of the flip-flops FF1 to FFn may perform a sampling operation using a plurality of pieces of pattern data PT_D1' to PT_Dn' that have passed through specific (or, alternatively, predetermined) data transmission paths and a clock signal CLK' that has passed through a specific (or, alternatively, predetermined) clock transmission path. Accordingly, the sampling circuit 320 may generate a plurality of pieces of sampling data Sample_D1 to Sample_Dn.

The comparator 340 may include a plurality of logic circuits LC1 to LCn. Each of the logic circuits LC1 to LCn may be or may include an XOR logic circuit. The plurality of logic circuits LC1 to LCn may generate a plurality of comparison results Comp_R1 to Comp_Rn by comparing the plurality of pieces of pattern data PT_1 to PT_n with the plurality of pieces of sampling data Sample_D1 to Sample_Dn, respectively.

The check result information generator 360 may receive the plurality of comparison results Comp_R1 to Comp_Rn and generate check result information by using the plurality of comparison results Comp_R1 to Comp_Rn. More details of the check result information generator 360 will be described with reference to FIGS. 9A and 9B.

Figure 9A:
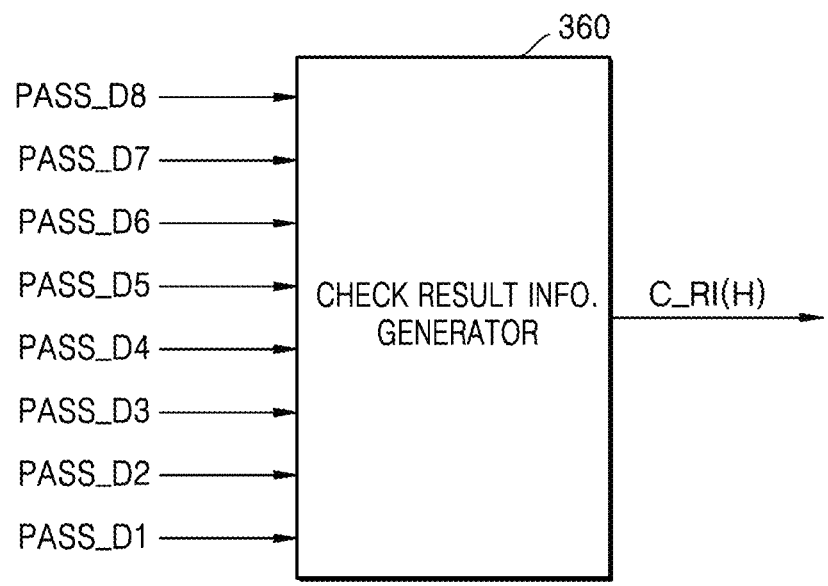
FIGS. 9A and 9B are diagrams for explaining a check result information generation method of a check result information generator of FIG. 8.
Figure 9B:
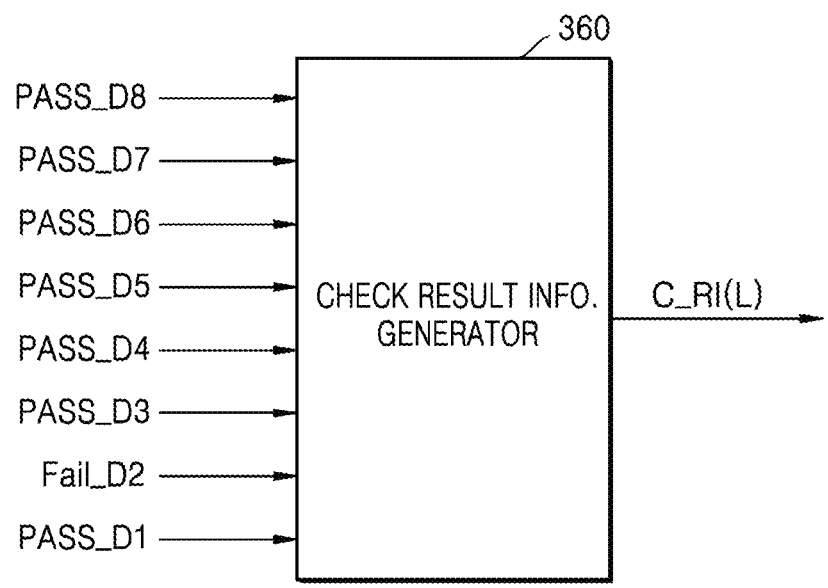

FIGS. 9A and 9B are diagrams for explaining a check result information generation method of the check result information generator 360 of FIG. 8.

In FIGS. 9A and 9B, eight pieces of parallel data are assumed to be transmitted and received between the memory controller and the memory device. Referring to FIGS. 8 and 9A, the sampling circuit 320 and the comparator 340 may generate eight comparison results Comp_R1 to Comp_R8 by using eight pieces of pattern data PT_D1 to PT_D8 and may provide the generated comparison results Comp_R1 to Comp_R8 to the check result information generator 360.

The check result information generator 360 in FIG. 9A may receive a plurality of pieces of pass data Pass_D1 to Pass_D8 as the comparison results Comp_R1 to Comp_R8. In an example embodiment, the check result information generator 360 in FIG. 9A may generate check result information C_RI having a first value H indicating that a re-training operation for the memory device is not required when the comparison results Comp_R1 to Comp_R8 are all the pass data Pass_D1 to Pass_D8.

The check result information generator 360 in FIG. 9B may receive a plurality of pieces of pass data Pass_D1 and Pass_D3 to Pass_D8 and one piece of fail data Fail_D2 as the comparison results Comp_R1 to Comp_R8. In an example embodiment, the check result information generator 360 in FIG. 9B may generate check result information C_RI having a second value L indicating that a re-training operation for the memory device is required, e.g. the memory device is to perform the re-training operation, when at least one piece of fail data is received. However, inventive concepts are not limited thereto. The check result information generator 360 may generate check result information C_RI having a second value L when fail data exceeding a specific (or, alternatively, predetermined) number of pieces of reference fail data is received. The number of pieces of reference fail data may be set in advance, and the number of pieces of reference fail data can be changed by a signal received from the outside.

Figure 10A:
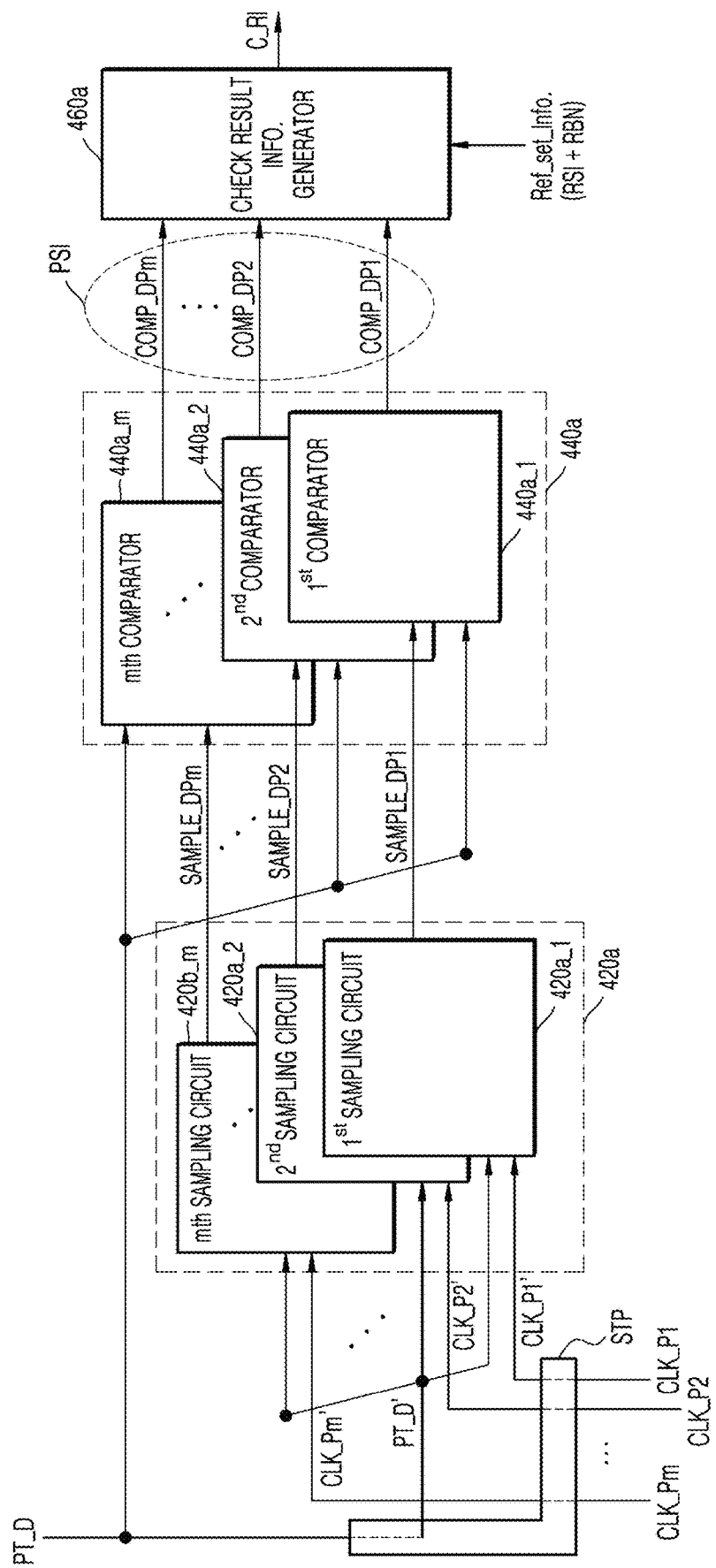
FIGS. 10A and 10B are block diagrams of path state check circuits that generate check result information based on the degree of alignment between pattern data and a clock signal, according to an example embodiment of the inventive concept.
Figure 10B:
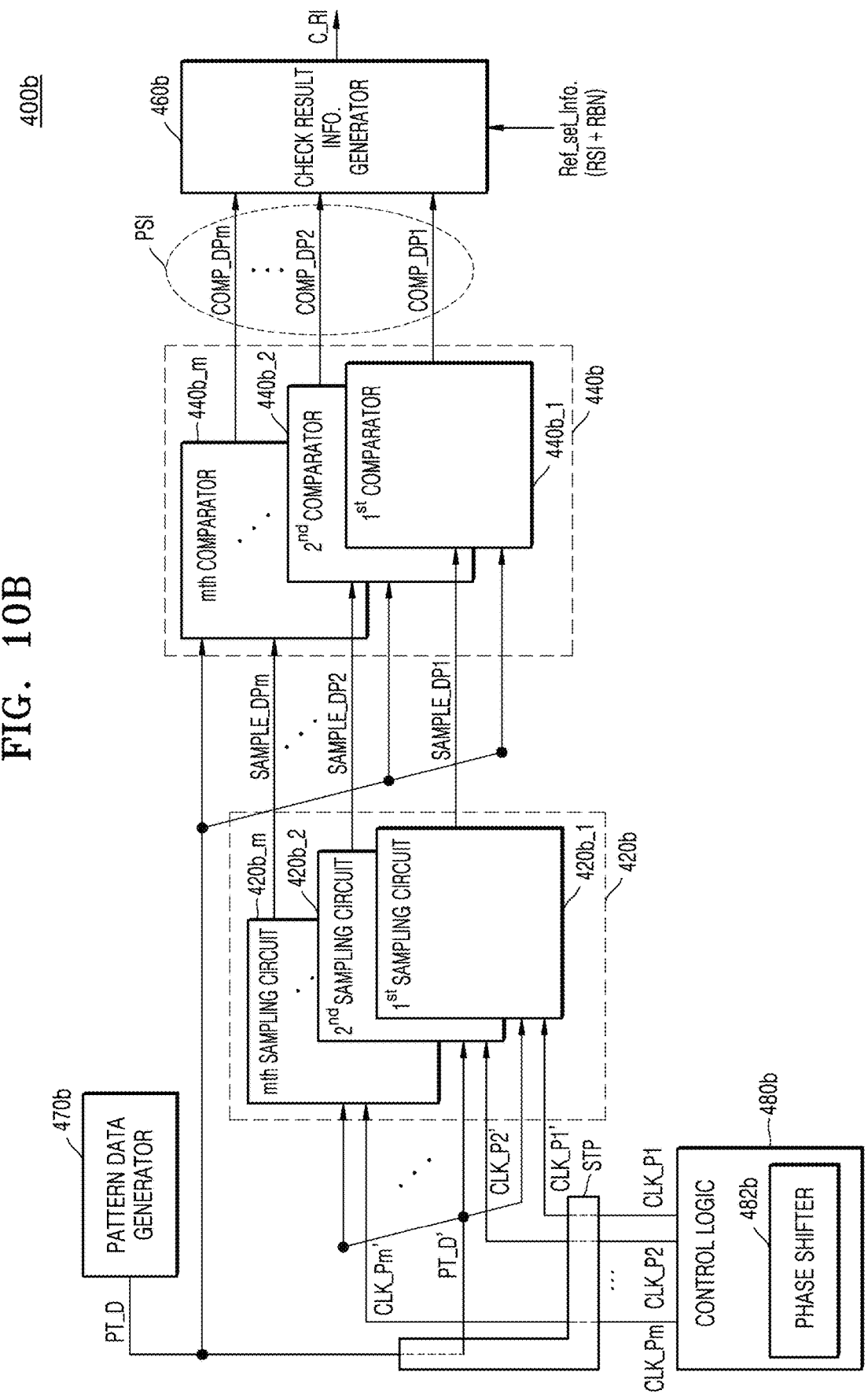

FIGS. 10A and 10B are block diagrams of path state check circuits 400a and 400b that generate check result information based on the degree of alignment between pattern data and a clock signal, according to an example embodiment of inventive concepts.

Referring to FIG. 10A, the path state check circuit 400*a* may include a sampling circuit 420*a*, a comparator 440*a*, and a check result information generator 460*a*. The sampling circuit 420*a* may include a plurality of sampling circuits 420*a*_1 to 420*a*_m. The comparator 440*a* may include a plurality of comparators 440*a*_1 to 440*a*_m.

The sampling circuits 420*a*_1 to 420*a*_m may receive pattern data PT_D' that has passed through a specific (or, alternatively, predetermined) data transmission path of a signal transmission path STP, and may respectively receive clock signals CLK_P1' to CLK_Pm' that have different phases and have passed through a specific (or, alternatively, predetermined) clock transmission path of the signal transmission path STP. Clock signals CLK_P1 to CLK_Pm may be shifted so as to have a constant phase difference. Each of the sampling circuits 420*a*_1 to 420*a*_m may perform a sampling operation by using a corresponding one of the clock signals CLK_P1' to CLK_Pm' and the pattern data PT_D' and generate a corresponding one of a plurality of pieces of sampling data Sample_DP1 to Sample_DPm. Each of the comparators 440*a*_1 to 440*a*_m may perform a comparison operation by using a corresponding one of the plurality of pieces of sampling data Sample_DP1 to Sample_DPm and pattern data PT_D, which is a comparison reference, and generate a corresponding one of comparison results Comp_DP1 to Comp_DPm. Path state information PSI may include the comparison results Comp_DP1 to Comp_DPm generated by the comparator 440*a*, and the path state information PSI may indicate the degree of alignment between the current pattern data PT_D' and a reference clock signal (or a clock signal having a shift phase of 0, for example, the clock signal CLK_P1').

The check result information generator 460*a* may generate check result information C_RI based on the path state information PSI and reference setting information Ref_set_Info. The reference setting information Ref_set_Info may include reference state information RSI and the number of reference bits RBN. The reference setting information Ref_set_Info may be stored in the storage circuit 246*a* of FIG. 3A. A detailed description thereof will be given below.

The path state check circuit 400*b* of FIG. 10B may further include a pattern data generator 470*b* and a clock signal generator 480*b* in comparison with the path state check circuit 400*a* of FIG. 10A. The pattern data generator 470*b* may generate pattern data PT_D including specific (or, alternatively, predetermined) pattern bits to check a state of a signal transmission path STP. The clock signal generator 480*b* may generate clock signals CLK_P1 to CLK_Pm having a specific (or, alternatively, predetermined) frequency and phase to check the state of the signal transmission path STP. The clock signal generator 480*b* may include a phase shifter 482*b* and may continuously shift a reference clock signal having a phase of 0 by a certain phase by using the phase shifter 482*b* to generate a plurality of clock signals CLK_P1 to CLK_Pm having different phases.

Figure 11:
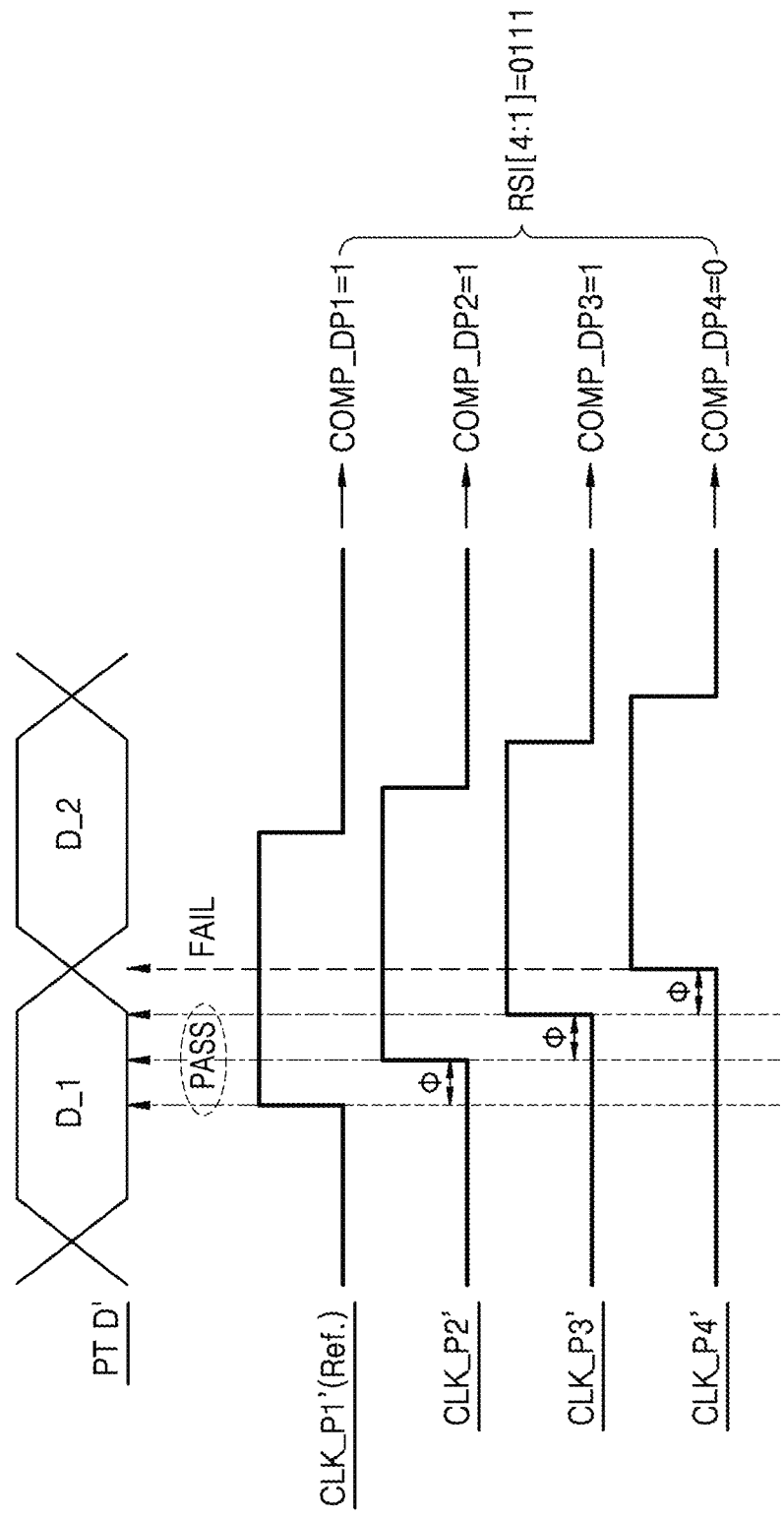
FIG. 11 is a diagram for explaining reference state information in FIG. 10A.

FIG. 11 is a diagram for explaining the reference state information in FIG. 10A.

Referring to FIGS. 10A and 11, the path state check circuit 400*a* may generate the reference state information RSI within a specific (or, alternatively, predetermined) time after a training operation for the memory device. The sampling circuit 420*a* may perform a plurality of sampling operations on pattern data PT_D' including first bit data D_1 and second bit data D_2 by using a first clock signal CLK_P1' (Ref.) and second to fourth clock signals CLK_P2 to CLK_P4' respectively shifted by a specific (or, alternatively, predetermined) phase c with respect to each other based on the first clock signal CLK_P1'(Ref.).

The comparator 440*a* may compare a plurality of pieces of sampling data generated by the sampling circuit 420*a* with the pattern data PT_D (see FIG. 10A) to generate a plurality of comparison results, e.g., the first to fourth comparison results Comp_DP1 to Comp_DP4. For example, since a sampling data generated using the first clock signal CLK_P1' as a reference matches the pattern data PT_D, the comparator 440*a* may generate the first comparison result Comp_DP1 having a value (e.g., a value of '1') indicating a pass result Pass. In this manner, since sampling data generated using the second and third clock signals CLK_P2' and CLK_P3' respectively shifted by Φ and 2Φ with respect to the first clock signal CLK_P1' matches the pattern data PT_D, the comparator 440*b* may generate the second and third comparison results Comp_DP2 and Comp_DP3 having a value indicating a pass result Pass. In addition, since sampling data generated using the fourth clock signal CLK_P4' shifted by 3Φ with respect to the first clock signal CLK_P1' does not match the pattern data PT_D, the comparator 440*b* may generate the fourth comparison result Comp_DP4 having a value (e.g. a value of '0') indicating a fail result Fail.

The reference state information RSI may include the first to fourth comparison results Comp_DP1 to Comp_DP4, and may have a value of '0111' as 4-bit data, for example. The reference state information RSI may be generated within a specific (or, alternatively, predetermined) time after a training operation for a memory device and may be a reference for determining whether to perform a re-training operation for the memory device.

FIGS. 12A to 13B are diagrams for explaining the operation of a path state check circuit for generating check result information C_RI by using path state information PSI, according to an example embodiment of inventive concepts.

Figure 12A:
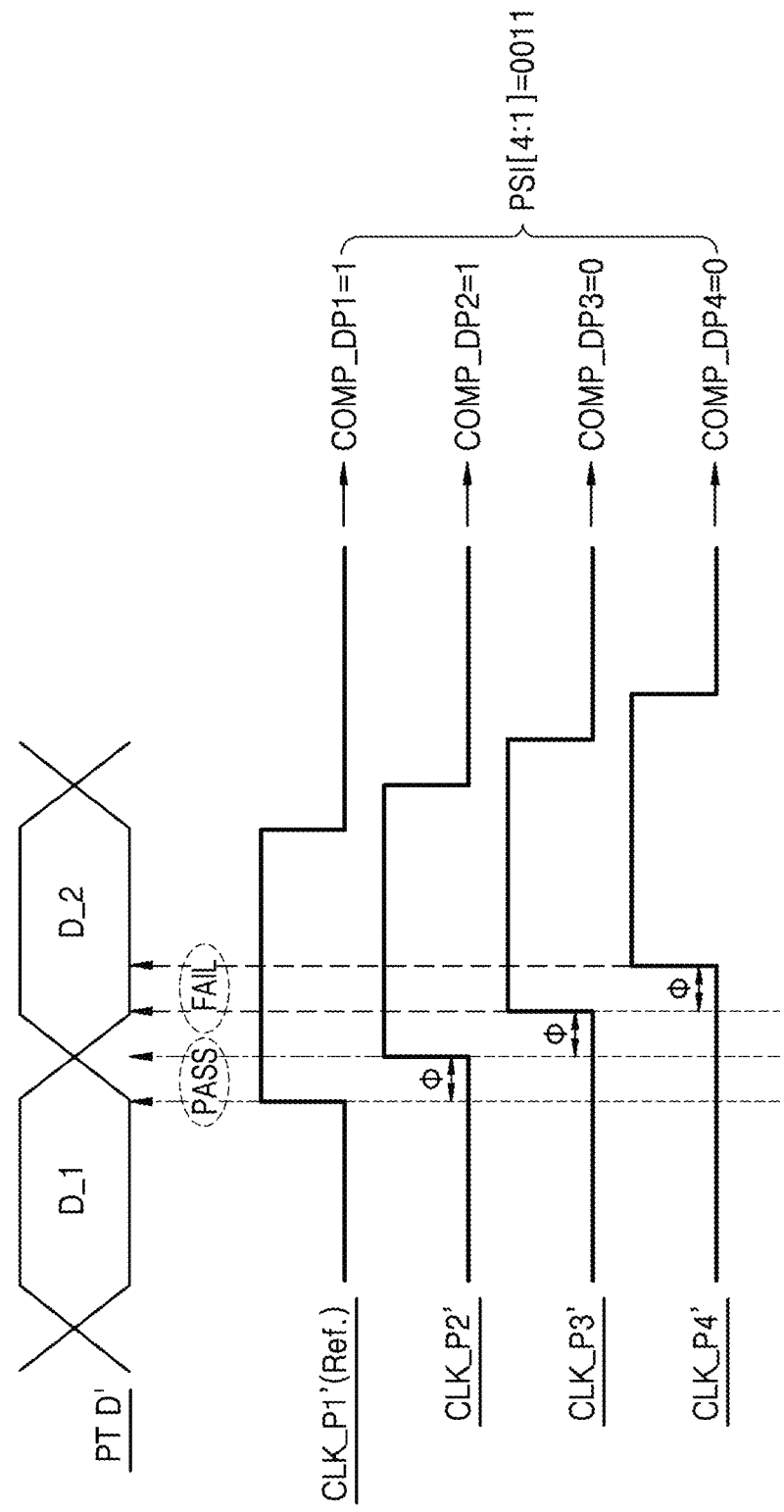
FIGS. 12A to 13B are diagrams for explaining the operation of a path state check circuit for generating check result information by using path state information, according to an example embodiment of the inventive concept.

Referring to FIGS. 10A and 12A, when receiving a command related to a signal transmission path state check from the outside or receiving an address signal having a specific value, or after a training operation of a memory device, the path state check circuit 400*a* may perform an operation of generating the path state information PSI every specific (or, alternatively, predetermined) period. Hereinafter, unlike in FIG. 11, a certain amount of time is assumed to have elapsed after a training operation for a memory device and thus an alignment between data and a clock signal which have passed through a signal transmission path has been somewhat wrong.

The sampling circuit 420*a* may perform a plurality of sampling operations on pattern data PT_D' including first bit data D_1 and second bit data D_2 by using a first clock signal CLK_P1'(Ref.) and second to fourth clock signals CLK_P2 to CLK_P4 respectively shifted by a specific (or, alternatively, predetermined) phase c with respect to each other based on the first clock signal CLK_P1'(Ref.). The comparator 440*a* may compare a plurality of pieces of sampling data generated by the sampling circuit 420*a* with the pattern data PT_D (see FIG. 10A) to generate a plurality of comparison results, i.e., first to fourth comparison results Comp_DP1 to Comp_DP4. Since sampling data generated using the first clock signal CLK_P1' as a reference and the second clock signal CLK_P2' matches the pattern data PT_D, the comparator 440*a* may generate the first and second comparison results Comp_DP1 and Comp_DP2 each having a value indicating a pass result Pass. In addition, since sampling data generated using the third and fourth clock signals CLK_P3' and CLK_P4' does not match the pattern data PT_D, the comparator 440a may generate the third and fourth comparison results Comp_DP3 and Comp_DP4 each having a value indicating a fail result Fail.

The path state information PSI may include the first to fourth comparison results Comp_DP1 to Comp_DP4. For example, the path state information PSI may have a value of '0011' as 4-bit data.

Figure 12B:
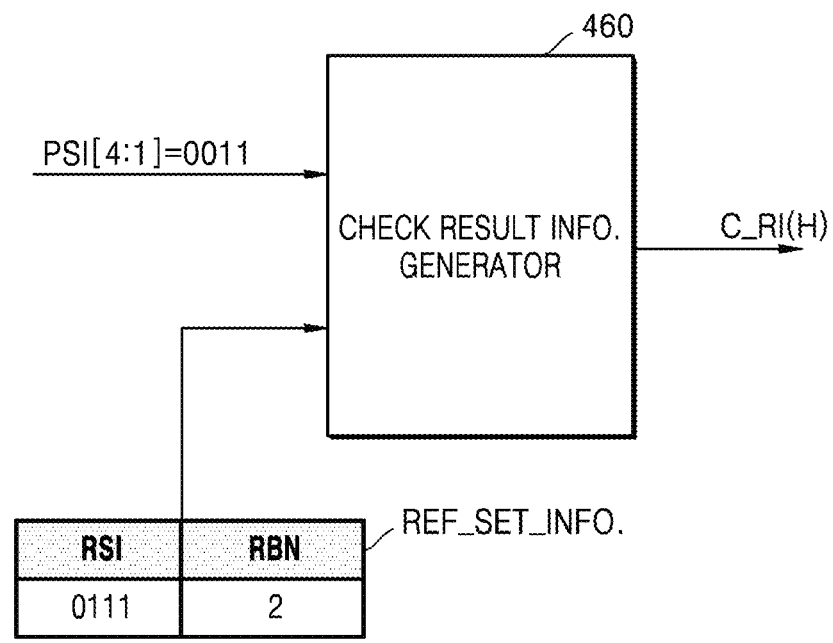

Referring to FIG. 12B, a check result information generator 460 may generate check result information C_RI indicating whether a re-training operation for a memory device is required, based on path state information PSI and reference setting information Ref_set_Info. The reference setting information Ref_set_Info may include reference state information RSI and the number of reference bits RBN. The reference state information RSI may be set to a value of '0111', as described above with reference to FIG. 11 and the number of reference bits RBN may be set to '2'. In an example embodiment, the number of reference bits RBN may be set based on the reference state information RSI. For example, the number of reference bits RBN may be set considering the number of bits included in the reference state information RSI and a value of the reference state information RSI. However, the value of the reference state information RSI and the number of reference bits RBN are not limited thereto and may be set to various values, and may be changed due to a factor such as the operating environment of the memory device.

The check result information generator 460 may compare the path state information PSI with the reference state information RSI. The check result information generator 460 may generate the check result information C_RI based on whether the number of different bits between the path state information PSI and the reference state information RSI is equal to or greater than the number of reference bits RBN. For example, since the value of the path state information PSI is '0011' and the value of the reference state information RSI is '0111', one bit is different therebetween, and the number of different bits is less than the number of reference bits RBN set to '2'.

Since the difference between the path state information PSI and the reference state information RSI is not large, the degree of misalignment between data and a clock signal may be determined to have not reached a level at which a memory operation fails. Accordingly, the check result information generator 460 may generate check result information C_RI having a first value H indicating that a re-training operation for a memory device is not required.

Figure 13A:
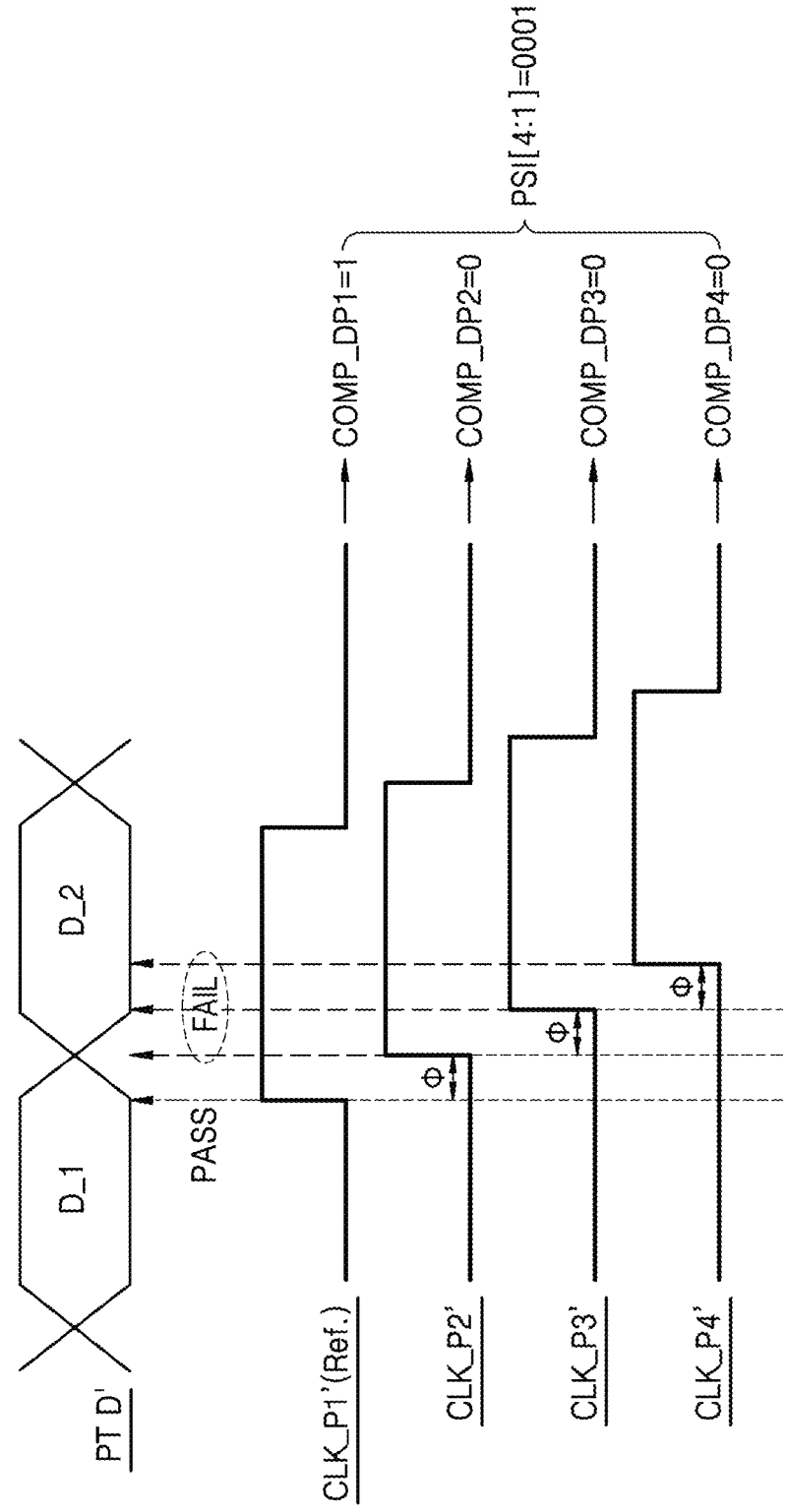
Figure 13B:
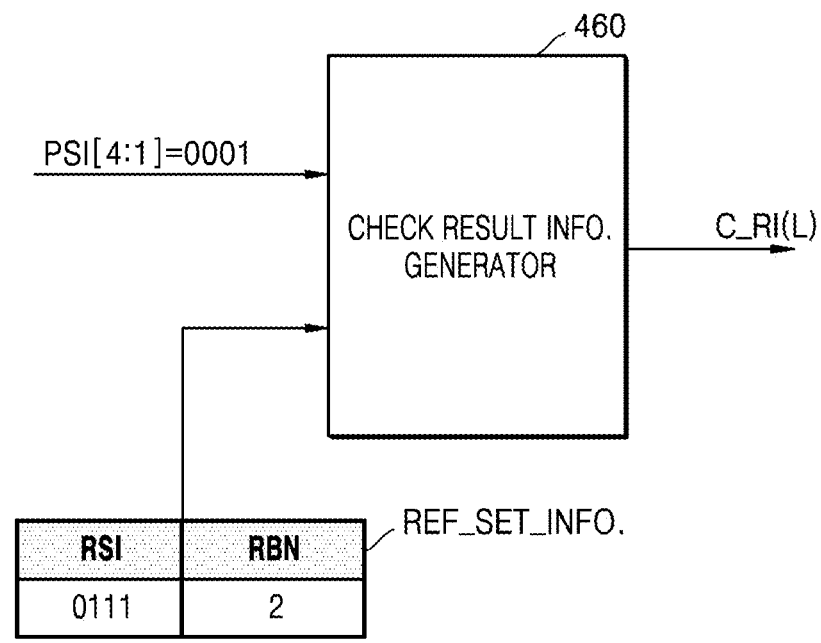

Referring to FIGS. 10A and 13A, the sampling circuit 420a may perform a plurality of sampling operations on pattern data PT_D' including first bit data D_1 and second bit data D_2 by using a first clock signal CLK_P1'(Ref.) and second to fourth clock signals CLK_P2 to CLK_P4 respectively shifted by a specific (or, alternatively, predetermined) phase c with respect to each other based on the first clock signal CLK_P1'(Ref.). The comparator 440a may compare a plurality of pieces of sampling data generated by the sampling circuit 420a with the pattern data PT_D (see FIG. 10A) to generate a plurality of comparison results, i.e., first to fourth comparison results Comp_DP1 to Comp_DP4. Since sampling data generated using the first clock signal CLK_P1' as a reference matches the pattern data PT_D, the comparator 440a may generate the first comparison result Comp_DP1 having a value indicating a pass result Pass. In addition, since sampling data generated using the second to fourth clock signals CLK_P2' to CLK_P4' does not match the pattern data PT_D, the comparator 440a may generate the second to fourth comparison results Comp_DP2 to Comp_DP4 each having a value indicating a fail result Fail.

The path state information PSI may include the first to fourth comparison results Comp_DP1 to Comp_DP4. For example, the path state information PSI may have a value of '0001' as 4-bit data.

The check result information generator 460 may compare the path state information PSI with the reference state information RSI. The check result information generator 460 may generate the check result information C_RI based on whether the number of different bits between the path state information PSI and the reference state information RSI is equal to or greater than the number of reference bits RBN. For example, since the value of the path state information PSI is '0001' and the value of the reference state information RSI is '0111', two bits are different therebetween, and the number of different bits is equal to the number of reference bits RBN set to '2'.

Since the difference between the path state information PSI and the reference state information RSI is large (the number of different bits is greater than or equal to the number of reference bits RBN), the degree of misalignment between data and a clock signal may be determined to have reached a level at which a memory operation fails. Accordingly, the check result information generator 460 may generate check result information C_RI having a second value L indicating that a re-training operation for a memory device is required, e.g. indicating to perform a re-training operation.

FIGS. 14A to 14D are timing diagrams for explaining a timing at which a path state check circuit according to an example embodiment of inventive concepts performs a check operation on a signal transmission path and a write operation of a memory device.

Figure 14A:
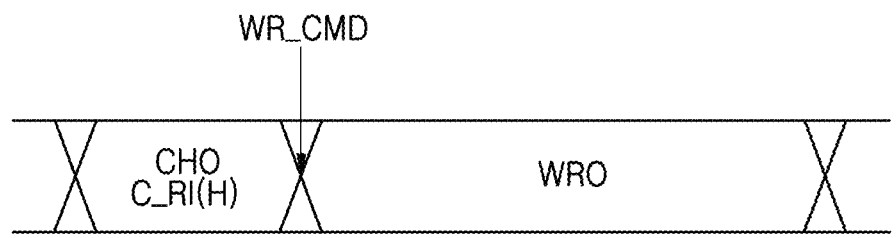
FIGS. 14A to 14D are timing diagrams for explaining a timing at which a path state check circuit according to an example embodiment of the inventive concept performs a check operation on a signal transmission path.

Referring to FIGS. 1 and 14A, in a state in which the memory device 20 has not received any command from the memory controller 10 or at an idle time, the path state check circuit 24 may perform a check operation CHO on a signal transmission path. When the state of a signal transmission path is good, the check result information C_RI generated by the path state check circuit 24 may have a first value H indicating that a re-training operation for the memory device 20 is not required, e.g. the memory device does not perform a re-training operation. The memory device 20 may immediately perform a write operation WRO in response to a write command WR_CMD received from the memory controller 10.

Figure 14B:
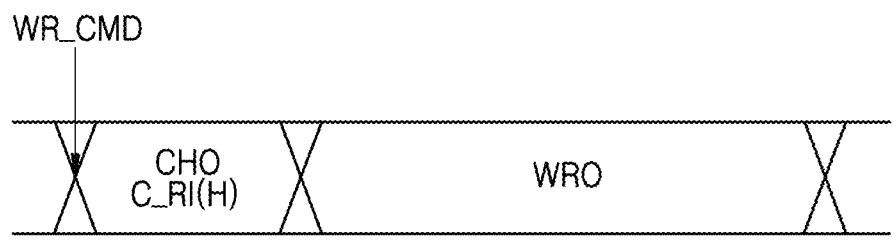

Referring to FIGS. 1 and 14B, at a timing before the memory device 20 performs a write operation WRO in response to a write command WR_CMD, the path state check circuit 24 performs a check operation CHO on a signal transmission path. For example, when the memory device 20 receives the write command WR_CMD from the memory controller 10, the path state check circuit 24 may first perform the check operation CHO on the signal transmission path. When the check result information C_RI generated by the path state check circuit 24 has a first value H indicating that a re-training operation for the memory device 20 is not required, the memory device 20 may immediately perform the write operation WRO in response to the write command WR_CMD after the check operation CHO.

Figure 14C:
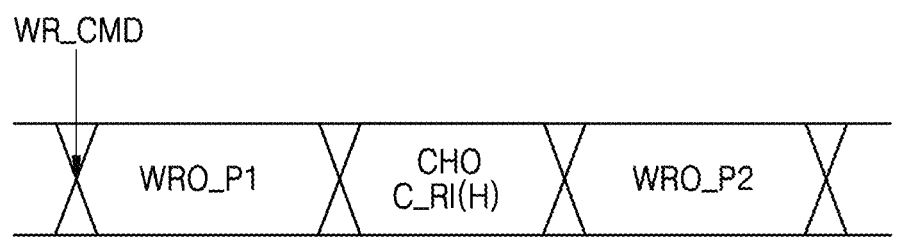

Referring to FIGS. 1 and 14C, the path state check circuit 24 may perform a check operation on a signal transmission path at a timing while the memory device 20 performs a specific (or, alternatively, predetermined) write operation. For example, after the memory device 20 performs a partial write operation WRO_P1 in response to a write command WR_CMD received from the memory controller 10, the path state check circuit 24 may perform a check operation CHO on a signal transmission path. The memory device 20 may perform the remaining write operation WRO_P2 after the completion of the check operation CHO. When the check result information C_RI generated by the path state check circuit 24 has a first value H indicating that a re-training operation for the memory device 20 is not required, the memory device 20 may immediately perform the remaining write operation WRO_P2.

Figure 14D:
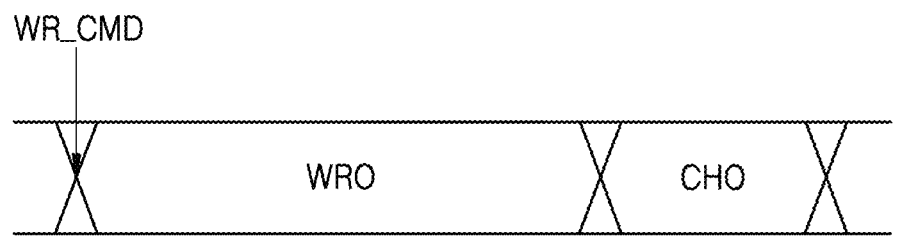

Referring to FIGS. 1 and 14D, the path state check circuit 24 may perform a check operation on a signal transmission path at a timing after the memory device 20 completes a write operation. For example, the memory device 20 may perform a write operation WRO in response to a write command WR_CMD received from the memory controller 10. Thereafter, the path state check circuit 24 may perform a check operation CHO on a signal transmission path.

For convenience of description, a case where the path state check circuit 24 performs a check operation on a signal transmission path without receiving a separate command is illustrated in FIGS. 14A to 14D. However, as described above, when receiving a command relating to a signal transmission path state check from the memory controller 10 or receiving an address signal having a specific value, or after a training operation of the memory device 20, the path state check circuit 24 may perform a check operation on a signal transmission path every specific (or, alternatively, predetermined) period.

In an example embodiment, when the memory device 20 is in a latency mode, the path state check circuit 24 may perform a check operation on a signal transmission path by using a clock signal formed after a specific (or, alternatively, predetermined) time in the latency mode. The latency mode may refer to a mode of the memory device 20 in which a clock signal required for a memory operation before the memory device 20 performs the memory operation is formed. That is, the path state check circuit 24 may perform a check operation by using a clock signal of a specific (or, alternatively, predetermined) period formed immediately before the memory operation.

Figure 15A:
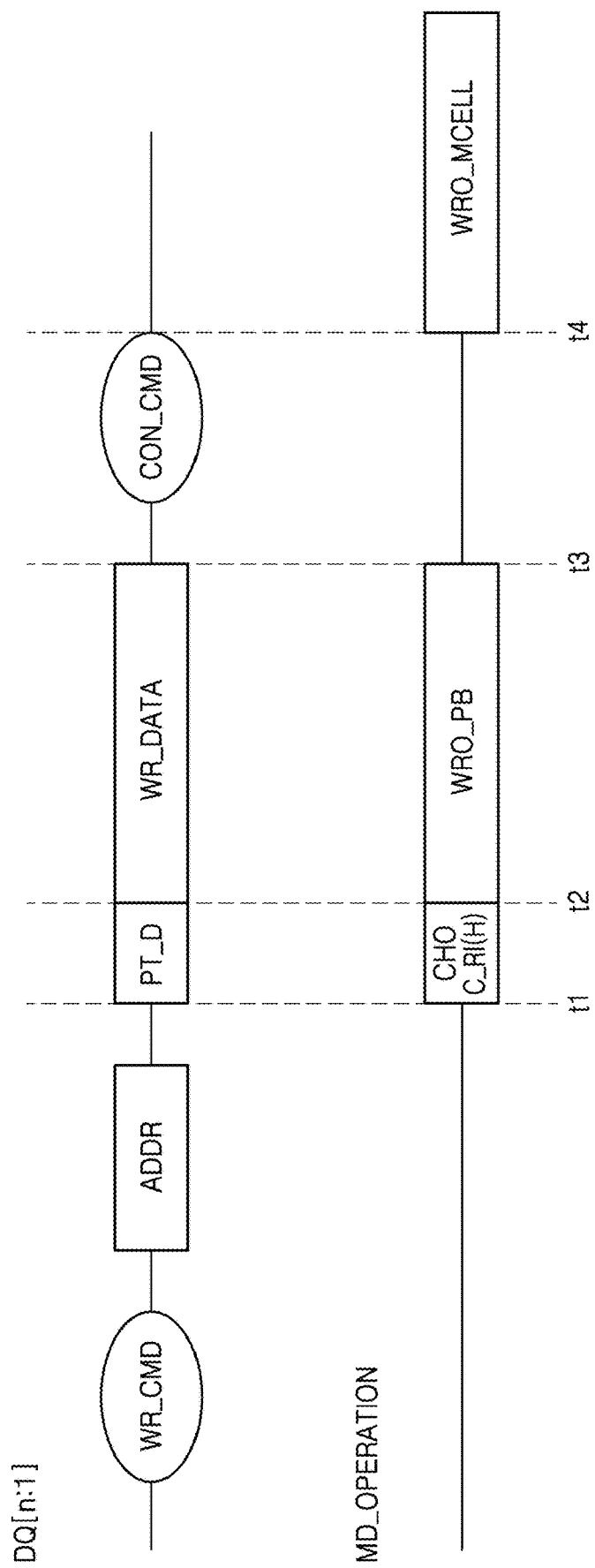
FIGS. 15A to 15C are diagrams for explaining a check operation of a path state check circuit and a write operation of a memory device, according to an arrangement relationship between write data and pattern data.
Figure 15B:
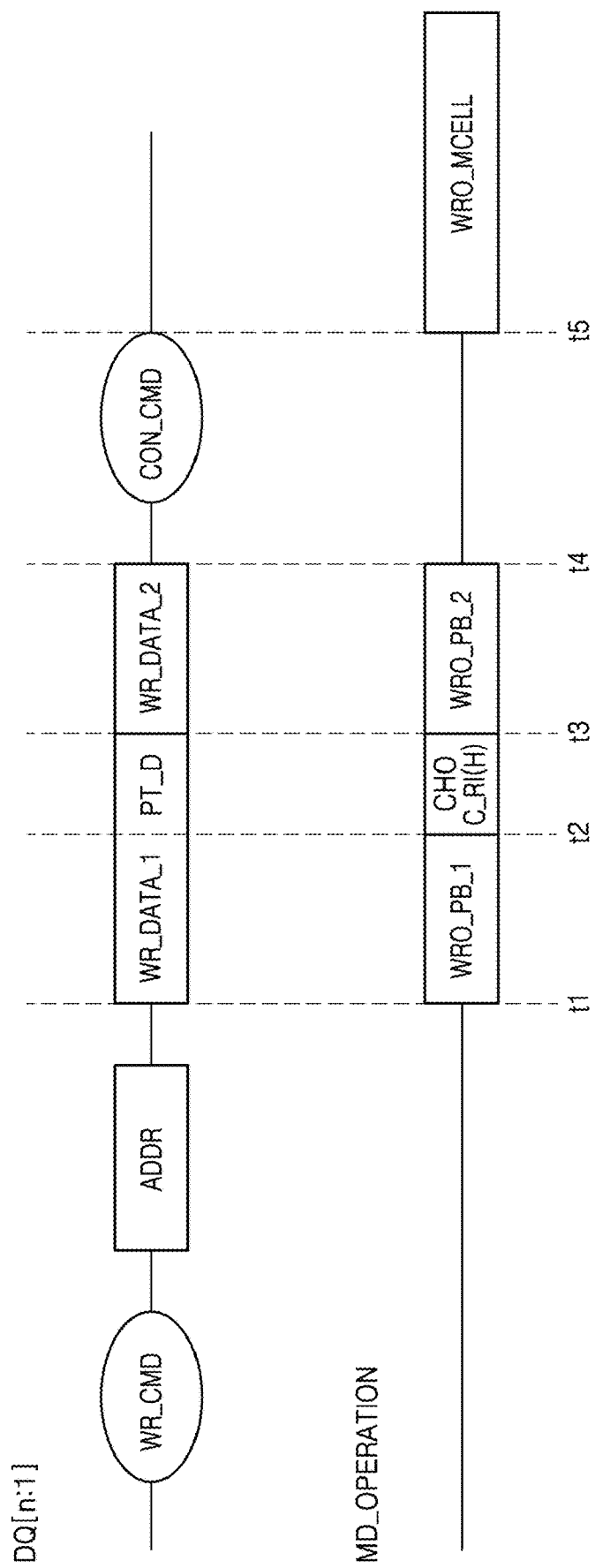
Figure 15C:
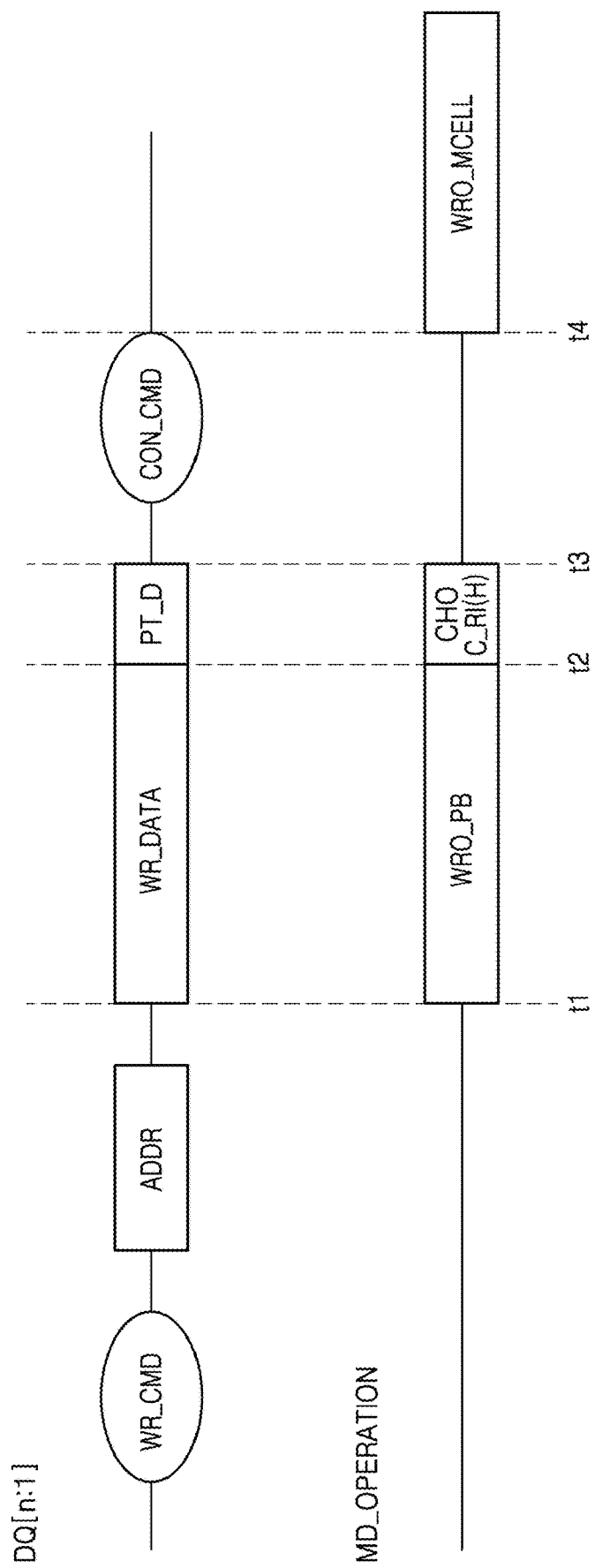

FIGS. 15A to 15C are diagrams for explaining a check operation of a path state check circuit and a write operation of a memory device MD, according to an arrangement relationship between write data WR_DATA and pattern data PT_D.

Referring to FIG. 15A, the memory device MD may receive a write command WR_CMD and an address signal ADDR from a memory controller. Thereafter, the memory device MD may receive data including pattern data PT_D and write data WR_DATA. In an example embodiment, the pattern data PT_D may be arranged at the front end of the write data WR_DATA. A path state check circuit of the memory device MD may perform an operation CHO of checking a signal transmission path state from time t1 at which the pattern data PT_D is received. Hereinafter, check result information C_RI having a first value H indicating that a re-training operation for the memory device MD is not necessary, e.g. is not to be performed, is assumed to be generated as a result of the check operation CHO. The memory device MD may perform an operation WRO_PB of writing the write data WR_DATA to the page buffer circuit 120 of FIG. 2 from time t2 to time t3. Thereafter, upon receiving a confirmation command CON_CMD from the memory controller, the memory device MD may perform an operation WRO_MCELL of writing the write data WR_DATA, stored in the page buffer circuit 120, to the memory cell array 160 of FIG. 2 from time t4. For example, the confirmation command CON_CMD may be a command for instructing the memory device MD to finally write data written in the page buffer circuit 120 to the memory cell array 160.

Referring to FIG. 15B, unlike in FIG. 15A, pattern data PT_D may be arranged between first write data WR_DATA_1 and second write data WR_DATA_2. The memory device MD may perform an operation WRO_PB_1 of writing the first write data WR_DATA_1 to the page buffer circuit 120 of FIG. 2 from time t1. The path state check circuit of the memory device MD may perform an operation CHO of checking a signal transmission path state from time t2 at which the pattern data PT_D is received. The memory device MD may perform an operation WRO_PB_2 of writing the second write data WR_DATA_2 to the page buffer circuit 120 of FIG. 2 from time t3. Thereafter, upon receiving a confirmation command CON_CMD from the memory controller, the memory device MD may perform an operation WRO_MCELL of writing the first and second write data WR_DATA_1 and WR_DATA_2, stored in the page buffer circuit 120, to the memory cell array 160 of FIG. 2 from time t5.

Referring to FIG. 15C, unlike in FIG. 15A, pattern data PT_D may be arranged at the rear end of the write data WR_DATA. The memory device MD may perform an operation WRO_PB of writing write data WR_DATA to the page buffer circuit 120 of FIG. 2 from time t1. The path state check circuit of the memory device MD may perform an operation CHO of checking a signal transmission path state from time t2, at which the pattern data PT_D is received, to time t3. Thereafter, upon receiving a confirmation command CON_CMD from the memory controller, the memory device MD may perform an operation WRO_MCELL of writing the write data WR_DATA, stored in the page buffer circuit 120, to the memory cell array 160 of FIG. 2 from time t4.

Figure 16A:
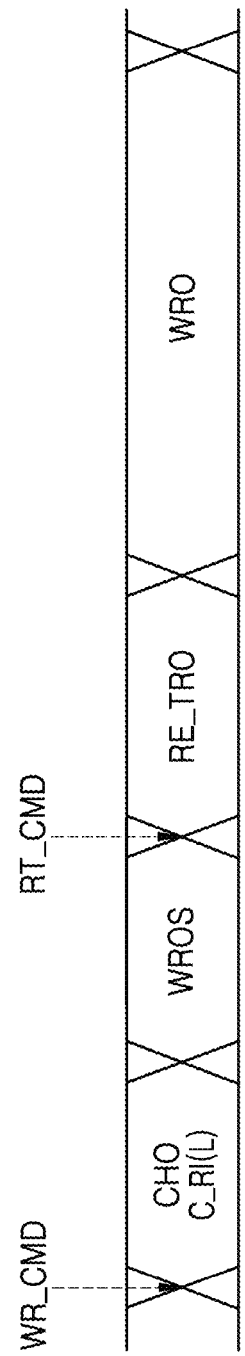
Figure 16B:
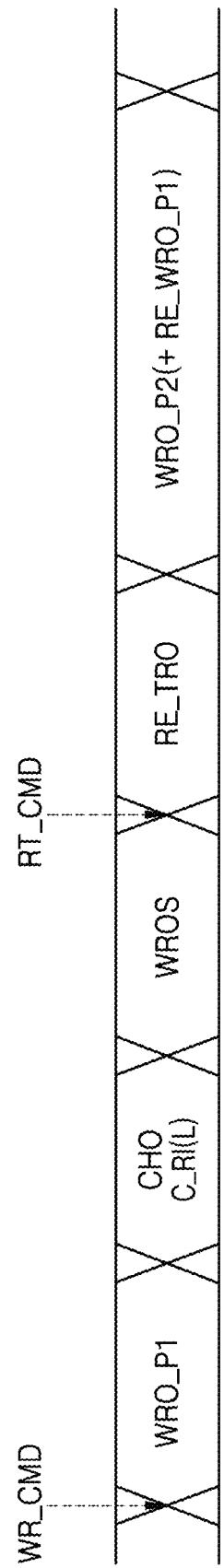

FIGS. 16A to 16C are timing diagrams for explaining an operation of a memory device which is based on check result information generated by a path state check circuit according to an example embodiment of inventive concepts.

Referring to FIGS. 1 and 16A, when the memory device 20 receives a write command WR_CMD from the memory controller 10, the path state check circuit 24 may perform a check operation on a signal transmission path. Thereafter, to perform a write operation WRO, the memory device 20 may determine whether to perform the write operation WRO by referring to the check result information C_RI. When the check result information C_RI generated by the path state check circuit 24 has a second value L indicating that a re-training operation for the memory device 20 is to be performed, the memory device 20 may perform an operation WROS of stopping a write operation. The operation WROS of stopping a write operation may be defined as a state in which the memory device 20 does not perform a series of write operations in response to the write command WR_CMD. However, inventive concepts are not limited thereto, and the operation WROS of stopping a write operation may be variously defined and examples of other definitions are described with reference to FIGS. 17A and 17B.

The memory controller 10 may refer to the check result information C_RI and provide a re-training command RT_CMD to the memory device 20. The memory device 20 may perform a re-training operation RE_TRO in response to the re-training command RT_CMD. As a result of performing the re-training operation RE_TRO, the value of the check result information C_RI may be changed to a first value H indicating that a re-training operation for the memory device 20 is not required, and the memory device 20 may perform a write operation WRO.

Referring to FIGS. 1 and 16B, when the memory device 20 receives a write command WR_CMD from the memory controller 10, the path state check circuit 24 may perform a check operation CHO on a signal transmission path after the memory device 20 performs a partial write operation WRO_P1 in response to the write command WR_CMD. When the check result information C_RI generated by the path state check circuit 24 has a second value L indicating that a re-training operation for the memory device 20 is required, e.g. is to be performed, the memory device may perform an operation WROS of stopping a write operation.

The memory controller 10 may refer to the check result information C_RI and provide a re-training command RT_CMD to the memory device 20. The memory device 20 may perform a re-training operation RE_TRO in response to the re-training command RT_CMD. As a result of performing the re-training operation RE_TRO, the value of the check result information C_RI may be changed to a first value H indicating that a re-training operation for the memory device 20 is not required, and the memory device 20 may perform the remaining write operation WRO_P2. Furthermore, the memory device 20 may selectively perform a rewrite operation RE_WRO_P1 on data written to the memory cell array 22 in the partial write operation WRO_P1 performed in a state in which an alignment between data and a clock signal is wrong.

Referring to FIGS. 1 and 16C, the memory device 20 may perform a write operation WRO in response to a write command WR_CMD received from the memory controller 10. Thereafter, the path state check circuit 24 may perform a check operation CHO on a signal transmission path. The check result information C_RI generated by the path state check circuit 24 may have a second value L indicating that a re-training operation for the memory device 20 is required, e.g. is to be performed.

The memory controller 10 may refer to the check result information C_RI and provide the memory device 20 with a re-training command RT_CMD. The memory device 20 may perform a re-training operation RE_TRO in response to the re-training command RT_CMD. As a result of performing the re-training operation RE_TRO, the value of the check result information C_RI may be changed to a first value H indicating that a re-training operation for the memory device 20 is not necessary, e.g. is not to be performed, and the memory device 20 may selectively perform a rewrite operation RE_WRO for re-performing the write operation WRO performed in a state in which an alignment between data and a clock signal is wrong.

As a result of referring to the check result information C_RI generated by the path state check circuit 24, when a re-training operation for the memory device 20 is required, e.g. is to be performed, a write operation is likely to fail. Thus, the memory device 20 may not perform a memory operation, e.g. an unnecessary memory operation, by not performing a write operation before performing the re-training operation.

Figure 17A:
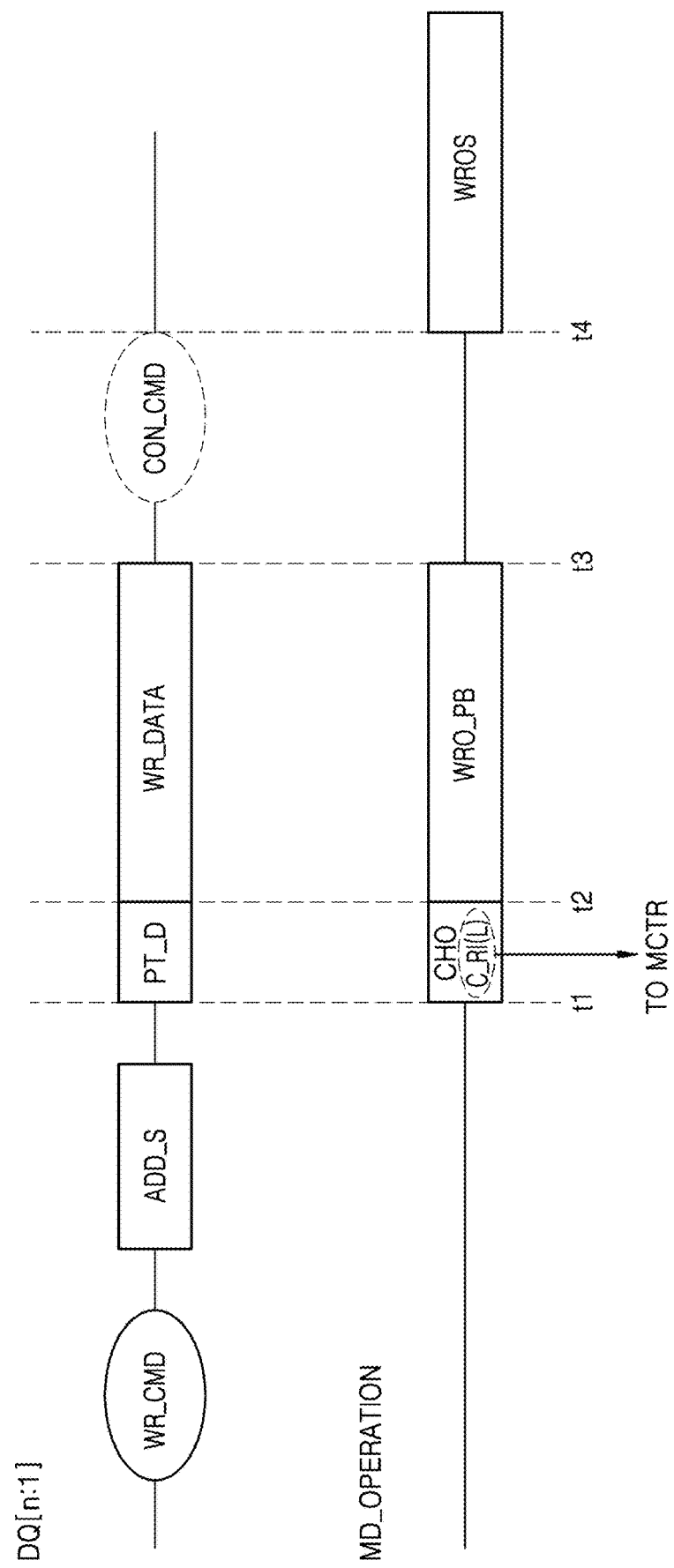
FIGS. 17A and 17B are diagrams for explaining another example of an operation of stopping a write operation of a memory device as shown in FIGS. 16A to 16C.
Figure 17B:
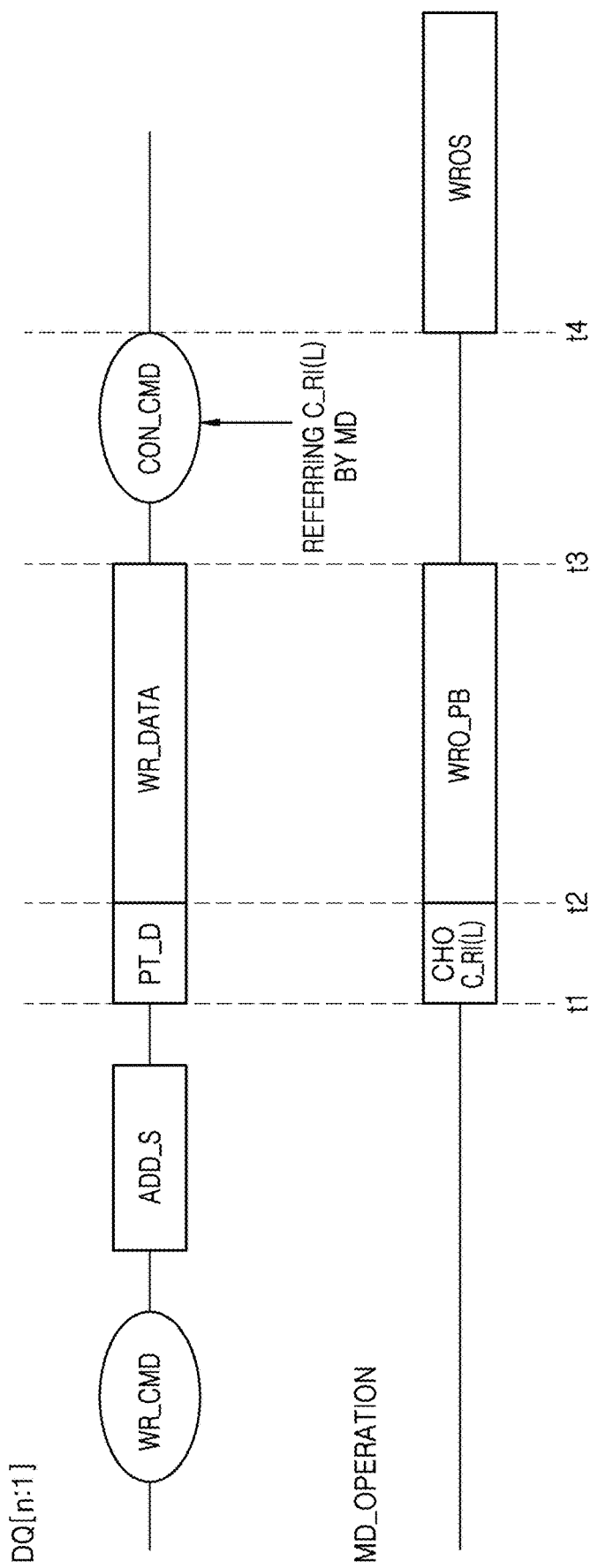

FIGS. 17A and 17B are diagrams for explaining another example of an operation WROS of stopping a write operation of a memory device MD as shown in FIGS. 16A to 16C.

Details of FIGS. 17A and 17B are similar to those described with reference to FIG. 15A, and thus, only characteristic contents will be described in detail. Hereinafter, check result information C_RI, which has a second value L indicating that a re-training operation for the memory device MD is required, is assumed to be generated as a result of a check operation CHO.

Referring to FIG. 17A, check result information C_RI generated by a path state check circuit of the memory device MD may be provided to a memory controller MCTR. Ann example embodiment in which the memory controller MCTR receives the check result information C_RI will be described with reference to FIGS. 18A and 18B. The memory controller MCTR may refer to the check result information C_RI to recognize that a re-training operation for the memory device MD is required e.g., is to be performed. An operation WRO_PB of writing write data WR_DATA in a page buffer circuit (i.e., the page buffer circuit 120 of FIG. 2) of the memory device MD may be low in reliability, and thus, the memory controller MCTR may not provide a confirmation command CON_CMD to the memory device MD. Thereafter, the memory device MD may not perform an operation of writing the write data WR_DATA stored in the page buffer circuit 120 to the memory cell array 160 of FIG. 2. For example, the operation WROS of stopping a write operation of the memory device MD may be defined as a state in which the memory device MD does not perform an operation of writing the write data WR_DATA stored in the page buffer circuit 120 to the memory cell array 160.

Referring to FIG. 17B, unlike in FIG. 17A, the check result information C_RI generated by the path state check circuit of the memory device MD may not be provided directly to the memory controller MCTR. Accordingly, the memory controller MCTR may not determine whether a re-training operation for the memory device MD is to be performed, and thus may provide a confirmation command CON_CMD to the memory device MD. When the memory device MD receives the confirmation command CON_CMD, the memory device MD may refer to the check result information C_RI to determine whether to perform an operation of writing the write data WR_DATA stored in the page buffer circuit 120 to the memory cell array 160 of FIG. 2. For example, when the check result information C_RI has a second value L indicating that a re-training operation for the memory device MD is required, even if the memory device MD receives the confirmation command CON_CMD, the memory device MD may not perform an operation of writing the write data WR_DATA stored in the page buffer circuit 120 to the memory cell array 160 of FIG. 2. That is, the memory device MD may perform the operation WROS of stopping a write operation.

FIG. 18A is a block diagram of a memory system 500a for explaining an example embodiment in which a memory controller 510a receives check result information C_RI from a memory device 530a, and FIG. 18B is a block diagram of a memory system 500b for explaining another embodiment in which a memory controller 510b receives check result information C_RI from a memory device 530b.

Referring to FIG. 18A, the memory system 500a may include a memory controller 510a and a memory device 530a. The memory device 530a may include a path state check circuit 532a as described above with reference to FIG. 1. The memory controller 510a may provide the memory device 530a with a check command Check_CMD for controlling a check operation of checking a state of a signal transmission path. The path state check circuit 532a may perform a check operation on the signal transmission path in response to the check command Check_CMD and generate check result information C_RI indicating whether a re-training operation of the memory device 530a is required.

The memory device 530a may provide the generated check result information C_RI to the memory controller 510a after the check operation on the signal transmission path is completed. The memory controller 510a may quickly determine whether to perform a re-training operation for the memory device 530a by referring to the check result information C_RI. When the memory controller 510a determines to perform the re-training operation, the memory controller 510a may provide a re-training command RT_CMD to the memory device 530a.

Referring to FIG. 18B, unlike in FIG. 18A, the memory controller 510b may provide a request signal to the memory device 530b to obtain check result information C_RI generated by a path state check circuit 532b. In an example embodiment, the check result information C_RI may be stored in a status register in which information indicating a status of the memory device 530b is stored. Accordingly, the memory controller 510b may provide a status read signal Status_read to the memory device 530b. The memory device 530b may provide status information Status_Info including the check result information C_RI to the memory controller 510b in response to the status read signal Status_read. The memory controller 510b may quickly determine whether to perform a re-training operation for the memory device 530b by referring to the check result information C_RI. When it is determined to perform the re-training operation, the memory controller 510b may provide a re-training command RT_CMD to the memory device 530b.

Figure 19:
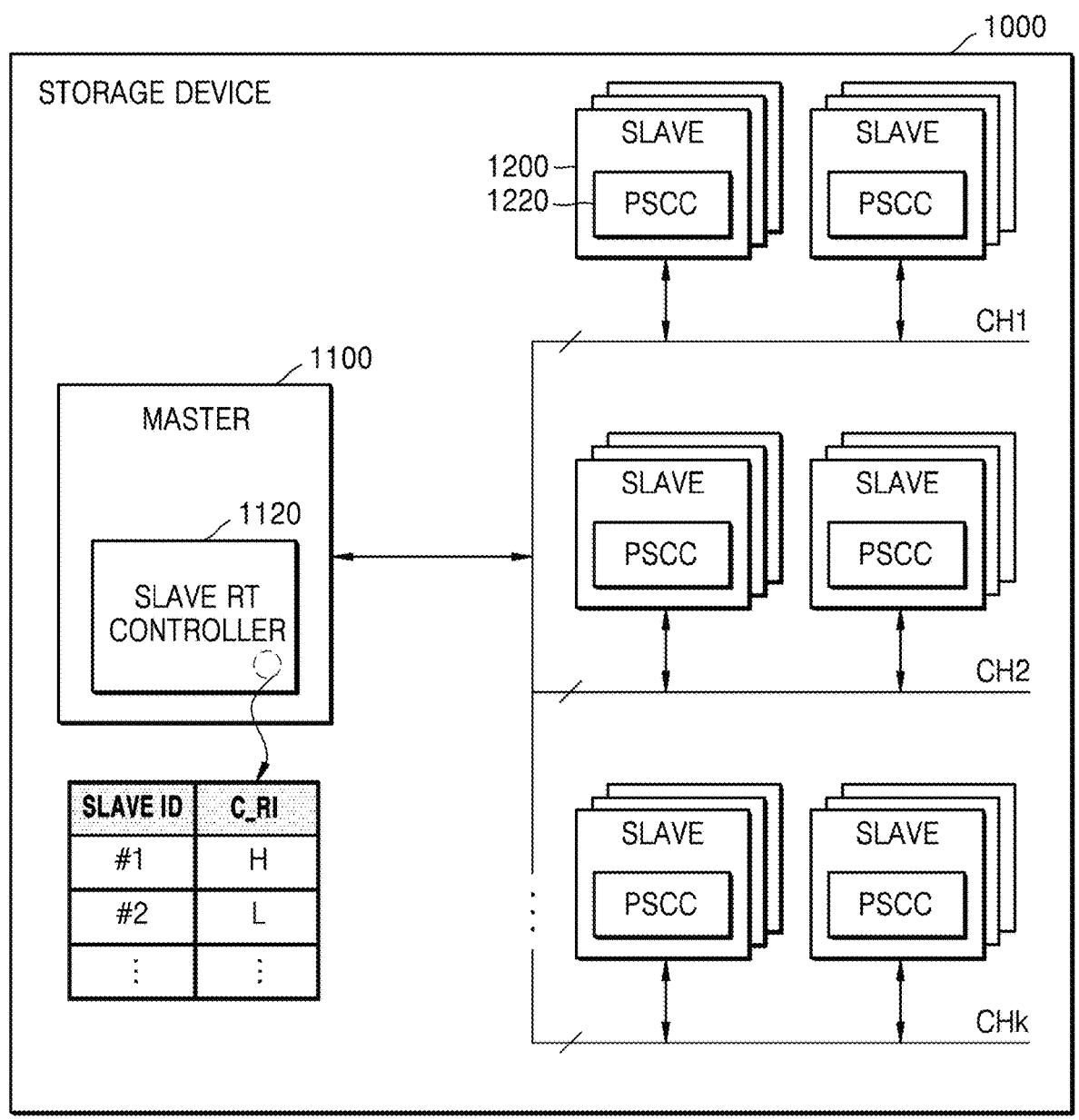
FIG. 19 is a block diagram of a storage device according to an example embodiment of the inventive concept.

FIG. 19 is a block diagram of a storage device 1000 according to an example embodiment of inventive concepts.

Referring to FIG. 19, the storage device 1000 may include a master (or controller) 1100 and a plurality of slaves (or memory chips) 1200. Each of the slaves 1200 may include a plurality of memory cells capable of storing data. The master 1100 may control data processing operations for the slaves 1200, such as a write operation, a read operation, an erase operation, a training operation, a re-training operation, and the like. The master 1100 and the slaves 1200 may be connected through a plurality of channels CH1 to CHk, and various pieces of data, a command, an address, and the like may be transmitted and received between the master 1100 and the slaves 1200 through the plurality of channels CH1 to CHk. Each of the slaves 1200 may include a path state check circuit (PSCC) 1220 that checks a state of a signal transmission path as described above with reference to FIG. 1 and generates check result information C_RI indicating whether a re-training operation for the slave 1200 is required. Characteristics of signal transmission paths in the slaves 1200 may be the same or different, and thus, reference setting information Ref_set_Info described with reference to FIG. 10A may be the same or different for each of the slaves 1200. For example, reference state information RSI and the number of reference bits RBN of a first slave connected to a first channel, e.g. the channel CH1, may be respectively different from reference state information RSI and the number of reference bits RBN of a second slave connected to a second channel, i.e., the channel CH2.

The master 1100 may include a slave re-training controller 1120, and the slave re-training controller 1120 may receive check result information C_RI from each of the plurality of slaves 1200. The slave re-training controller 1120 may manage a slave ID and check result information C_RI corresponding thereto in an internal memory space. In addition, the slave re-training controller 1120 may quickly determine whether to perform a re-training operation for the slaves 1200 by referring to the check result information C_RI, and may control individual re-training operations.

Figure 20:
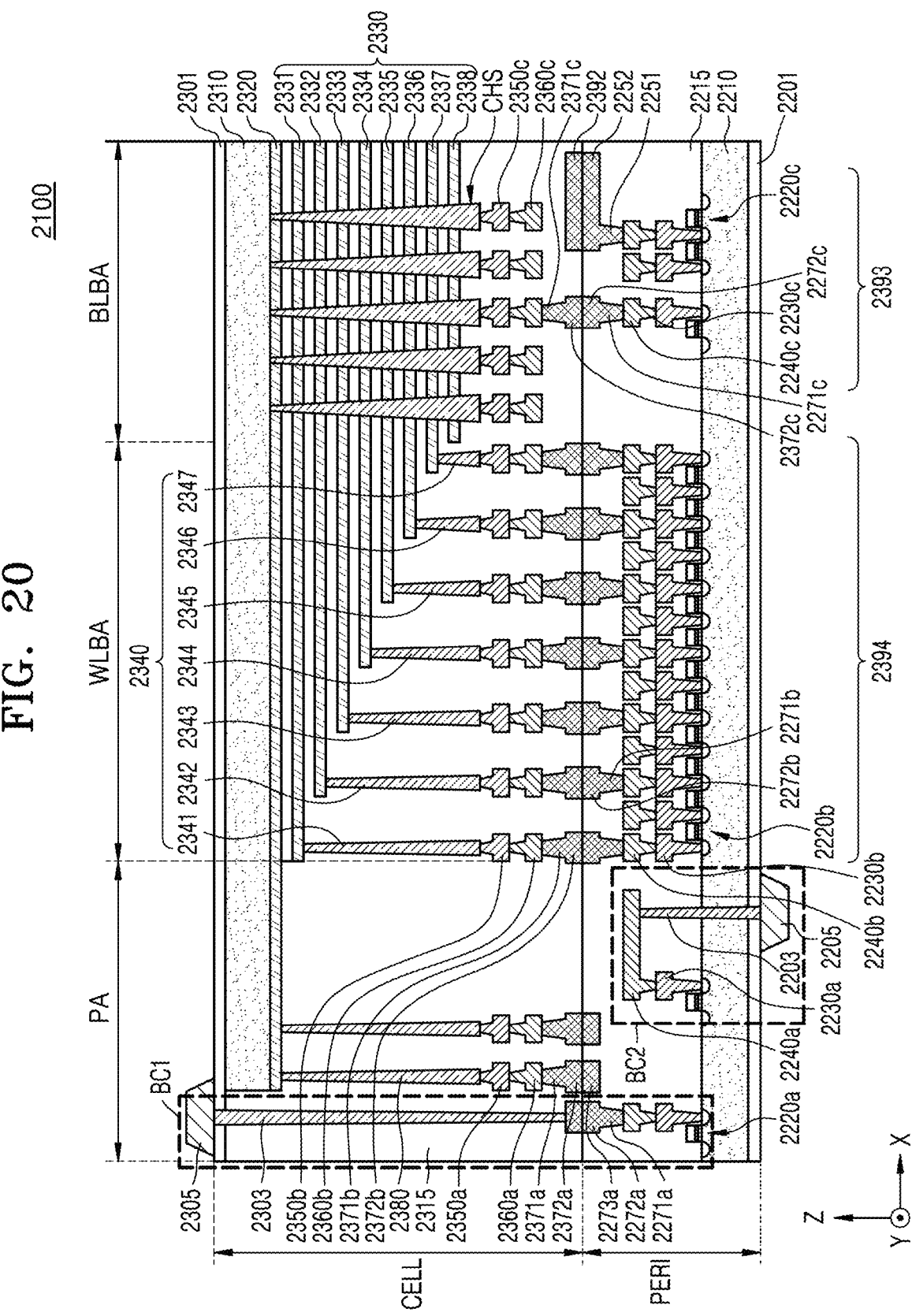
FIG. 20 is a cross-section of a memory device according to an example embodiment of inventive concepts.

FIG. 20 is a cross-section of a memory device according to some example embodiments.

Referring to FIG. 20, a memory device 2100 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then connecting the upper chip and the lower chip in a bonding manner. For example, the bonding manner may include a method of electrically connecting a bonding metal formed on an uppermost metal layer of the upper chip and a bonding metal formed on an uppermost metal layer of the lower chip. For example, when the bonding metals may be formed of copper (Cu), the bonding manner may be a Cu—Cu bonding, and the bonding metals may also be formed of aluminum or tungsten.

Each of the peripheral circuit region PERI and the cell region CELL of the memory device 2100 may include an external pad bonding area PA, a word line bonding area WLBA, and a bit line bonding area BLBA.

The peripheral circuit region PERI may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c formed on the first metal layers 2230a, 2230b, and 2230c. In an example embodiment, the first metal layers 2230a, 2230b, and 2230c may be formed of tungsten having relatively high resistance, and the second metal layers 2240a, 2240b, and 2240c may be formed of copper having relatively low resistance.

In an example embodiment illustrate in FIG. 20, although the first metal layers 2230a, 2230b, and 2230c and the second metal layers 2240a, 2240b, and 2240 care shown and described, they are not limited thereto, and one or more metal layers may be further formed on the second metal layers 2240a, 2240b, and 2240c. At least a portion of the one or more metal layers formed on the second metal layers 2240a, 2240b, and 2240c may be formed of aluminum or the like having a lower resistance than those of copper forming the second metal layers 2240a, 2240b, and 2240c.

The interlayer insulating layer 2215 may be disposed on the first substrate 2210 and cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the word line bonding area WLBA. In the word line bonding area WLBA, the lower bonding metals 2271b and 2272b in the peripheral circuit region PERI may be electrically connected to c in a bonding manner, and the lower bonding metals 2271b and 2272b and the upper bonding metals 2371b and 2372b may be formed of aluminum, copper, tungsten, or the like. Further, the upper bonding metals 2371b and 2372b in the cell region CELL may be referred as first metal pads and the lower bonding metals 2271b and 2272b in the peripheral circuit region PERI may be referred as second metal pads.

The cell region CELL may include at least one memory block. The cell region CELL may include a second substrate 2310 and a common source line 2320. On the second substrate 2310, a plurality of word lines 2331 to 2338 (i.e., 2330) may be stacked in a direction (a Z-axis direction), perpendicular to an upper surface of the second substrate 2310. At least one string select line and at least one ground select line may be arranged on and below the plurality of word lines 2330, respectively, and the plurality of word lines 2330 may be disposed between the at least one string select line and the at least one ground select line.

In the bit line bonding area BLBA, a channel structure CH may extend in a direction, perpendicular to the upper surface of the second substrate 2310, and pass through the plurality of word lines 2330, the at least one string select line, and the at least one ground select line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bit line contact, and the second metal layer 2360c may be a bit line. In an example embodiment, the bit line 2360c may extend in a first direction (a Y-axis direction), parallel to the upper surface of the second substrate 310.

In an example embodiment illustrated in FIG. 20, an area in which the channel structure CH, the bit line 2360c, and the like are disposed may be defined as the bit line bonding area BLBA. In the bit line bonding area BLBA, the bit line 2360c may be electrically connected to the circuit elements 2220c providing a page buffer 2393 in the peripheral circuit region PERI. For example, the bit line 2360c may be connected to upper bonding metals 2371c and 2372c in the cell region CELL, and the upper bonding metals 2371c and 2372c may be connected to lower bonding metals 2271c and 2272c connected to the circuit elements 2220c of the page buffer 2393.

In the word line bonding area WLBA, the plurality of word lines 2330 may extend in a second direction (an X-axis direction), parallel to the upper surface of the second substrate 2310, and may be connected to a plurality of cell contact plugs 2341 to 2347 (i.e., 2340). The plurality of word lines 2330 and the plurality of cell contact plugs 2340 may be connected to each other in pads provided by at least a portion of the plurality of word lines 2330 extending in different lengths in the second direction. A first metal layer 2350b and a second metal layer 2360b may be connected to an upper portion of the plurality of cell contact plugs 2340 connected to the plurality of word lines 2330, sequentially. The plurality of cell contact plugs 2340 may be connected to the circuit region PERI by the upper bonding metals 2371b and 2372b of the cell region CELL and the lower bonding metals 2271b and 2272b of the peripheral circuit region PERI in the word line bonding area WLBA.

The plurality of cell contact plugs 2340 may be electrically connected to the circuit elements 2220b providing a row decoder 2394 in the peripheral circuit region PERI. In an example embodiment, operating voltages of the circuit elements 2220b providing the row decoder 2394 may be different than operating voltages of the circuit elements 2220c providing the page buffer 2393. For example, operating voltages of the circuit elements 2220c providing the page buffer 2393 may be greater than operating voltages of the circuit elements 2220b providing the row decoder 2394.

A common source line contact plug 2380 may be disposed in the external pad bonding area PA. The common source line contact plug 2380 may be formed of a conductive material such as a metal, a metal compound, poly silicon, or the like, and may be electrically connected to the common source line 2320. A first metal layer 2350a and a second metal layer 2360a may be stacked on an upper portion of the common source line contact plug 2380, sequentially. For example, an area in which the common source line contact plug 2380, the first metal layer 2350a, and the second metal layer 2360a are disposed may be defined as the external pad bonding area PA.

Input-output pads 2205 and 2305 may be disposed in the external pad bonding area PA. Referring to FIG. 20, a lower insulating film 2201 covering a lower surface of the first substrate 2210 may be formed below the first substrate 2210, and a first input-output pad 2205 may be formed on the lower insulating film 2201. The first input-output pad 2205 may be connected to at least one of the plurality of circuit elements 2220a, 2220b, and 2220c disposed in the peripheral circuit region PERI through a first input-output contact plug 2203, and may be separated from the first substrate 2210 by the lower insulating film 2201. In addition, a side insulating film may be disposed between the first input-output contact plug 2203 and the first substrate 2210 to electrically separate the first input-output contact plug 2203 and the first substrate 2210.

Referring to FIG. 20, an upper insulating film 2301 covering the upper surface of the second substrate 2310 may be formed on the second substrate 2310, and a second input-output pad 2305 may be disposed on the upper insulating layer 301. The second input-output pad 2305 may be connected to at least one of the plurality of circuit elements 2220a, 2220b, and 2220c disposed in the peripheral circuit region PERI through a second input-output contact plug 2303.

According to embodiments, the second substrate 2310 and the common source line 2320 may not be disposed in an area in which the second input-output contact plug 2303 is disposed. Also, the second input-output pad 2305 may not overlap the word lines 2330 in the third direction (the Z-axis direction). Referring to FIG. 20, the second input-output contact plug 2303 may be separated from the second substrate 2310 in a direction, parallel to the upper surface of the second substrate 2310, and may pass through the interlayer insulating layer 2315 of the cell region CELL to be connected to the second input-output pad 2305.

According to embodiments, the first input-output pad 2205 and the second input-output pad 2305 may be selectively formed. For example, the memory device 2100 may include only the first input-output pad 2205 disposed on the first substrate 2210 or the second input-output pad 2305 disposed on the second substrate 2310. Alternatively, the memory device 2100 may include both the first input-output pad 2205 and the second input-output pad 305.

A metal pattern in an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 2100 may include a lower metal pattern 2273a, corresponding to an upper metal pattern 2372a formed in an uppermost metal layer of the cell region CELL, and having the same shape as the upper metal pattern 2372a of the cell region CELL, in an uppermost metal layer of the peripheral circuit region PERI. In the peripheral circuit region PERI, the lower metal pattern 2273a formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as a lower metal pattern of the peripheral circuit region PERI, may be formed in an uppermost metal layer of the cell region CELL.

The lower bonding metals 2271*b* and 2272*b* may be formed on the second metal layer 2240*b* in the word line bonding area WLBA. In the word line bonding area WLBA, the lower bonding metals 2271*b* and 2272*b* of the peripheral circuit region PERI may be electrically connected to the upper bonding metals 371*b* and 372*b* of the cell region CELL by a Cu—Cu bonding.

Further, the bit line bonding area BLBA, an upper metal pattern 2392, corresponding to a lower metal pattern 2252 formed in the uppermost metal layer of the peripheral circuit region PERI, and having the same shape as the lower metal pattern 2252 of the peripheral circuit region PERI, may be formed in an uppermost metal layer of the cell region CELL. A contact may not be formed on the upper metal pattern 2392 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same shape as the metal pattern may be formed in an uppermost metal layer in another one of the cell region CELL and the peripheral circuit region PERI, and a contact may not be formed on the reinforcement metal pattern.

The path state check circuit 24 (see FIG. 1) according to an example embodiment of the inventive concept may check states (e.g., connectivity) of first and second bonding connections BC1 and BC2 in the memory device 2100 and generate check result information. In an example embodiment, the first bonding connection BC1 may include a first input/output pad 2205, a first input/output contact plug 2203, a first metal layer 2230*a*, and a second metal layer 2240*a*. The second bonding connection BC2 may include a second input/output pad 2305, a second input/output contact plug 2303, and lower bonding metals 2272*a* and 2271*a*. Specifically, the path state check circuit 24 in FIG. 1 may check a state of the first bonding connection BC1 corresponding to a signal path between the first input/output pad 2205 and the peripheral circuit area PERI and a state of the second bonding connection BC2 corresponding to a signal path between the second input/output pad 2305 and the peripheral circuit area PERI and generate check result information. However, this is only an example embodiment, and the path state check circuit 24 in FIG. 1 may check a state of each of the more bonding connections.

The memory controller 10 (see FIG. 1) according to example embodiments of the inventive concept may receive the check result information as described above from the memory device 2100, and the memory controller 10 in FIG. 1 may quickly determine whether to perform a re-training operation on the memory device 2100 without a separate state determination operation of the memory device 2100.

While inventive concepts have been particularly shown and described with reference to embodiments thereof, it will be understood that various changes in form and details may be made therein without departing from the spirit and scope of the following claims.

What is claimed is:

1. A method of operating a memory device, the method comprising:
   receiving a write command from a memory controller;
   receiving data including pattern data and write data from the memory controller through a signal transmission path;
   generating check result information by performing a first operation of checking a state of the signal transmission path by using the pattern data;
   performing a second operation of writing the write data to a page buffer circuit;
   receiving a confirmation command from the memory controller; and
   writing, in response to the confirmation command, the write data stored in the page buffer circuit to memory cells.

2. The method of claim 1, wherein, in the data, the pattern data is arranged at a front end of the write data, and
   the first operation is performed prior to the second operation.

3. The method of claim 1, wherein the write data includes first write data and second write data,
   in the data, the pattern data is arranged between the first write data and the second write data, and
   the first operation is performed between an operation on the first write data in the second operation and an operation on the second write data in the second operation.

4. The method of claim 1, wherein, in the data, the pattern data is arranged at a rear end of the write data, and
   the first operation is performed after the second operation.

5. The method of claim 1, wherein the writing of the write data to the memory cells comprises confirming the check result information in response to the confirmation command, and
   the writing of the write data to the memory cells is performed when the check result information has a value indicating that a retraining operation is unnecessary.

6. The method of claim 1, further comprising
   transmitting the check result information to the memory controller,
   wherein the receiving of the confirmation command is performed when the check result information has a value indicating that a retraining operation on the memory device is unnecessary.

7. The method of claim 6, wherein the transmitting of the check result information to the memory controller is performed in response to a status read signal received from the memory controller.

8. The method of claim 1, wherein the generating of the check result information comprises:
   performing a sampling operation by using the pattern data, which has passed through data transmission path included in the signal transmission path, and a clock signal, which has passed through a clock transmission path included in the signal transmission path;
   comparing sample data generated from the sampling operation with reference data matching the pattern data; and
   generating the check result information based on a result of the comparing.

9. A method of operating a memory device, the method comprising:
   receiving a write command and data including write data and pattern data from a memory controller;
   storing the write data in a page buffer circuit;
   generating check result information by performing a check operation on a path through which the data is received using the pattern data;
   determining whether to stop a write operation in response to the write command based on the check result information; and handling the write data stored in the page buffer circuit based on a result of the determination.

10. The method of claim 9, wherein the determining of whether to stop the write operation comprises:
confirming that the check result information has a first value indicating that a retraining operation on the memory device is unnecessary; and
determining to perform the write operation based on a confirmation result,
wherein the handling the write data comprises:
writing the write data stored in the page buffer circuit to memory cells.

11. The method of claim 9, wherein the determining of whether to stop the write operation comprises:
confirming that the check result information has a second value indicating that a retraining operation on the memory device is necessary; and
determining to stop the write operation based on a confirmation result.

12. The method of claim 11, wherein the write data is stored in the page buffer circuit while the write operation is stopped.

13. The method of claim 11, further comprising
receiving, from the memory controller, a retraining command based on the second value of the check result information;
performing a retraining operation in response to the retraining command; and
changing the second value of the check result information to a first value indicating that a retraining operation on the memory device is unnecessary.

14. The method of claim 13, further comprising
wherein the handling the write data comprises
resuming the write operation based on the first value of the check result information; and
writing the write data stored in the page buffer circuit to memory cells.

15. The method of claim 13, wherein the resuming of the write operation comprises performing a rewrite operation on some data written to memory cells performed before the retraining operation among the write data.

16. A method of operating a memory controller, the method comprising:
transmitting pattern data and a clock signal to a memory device;
receiving, from the memory device, information including a result of a check operation on a state of a signal transmission path by using the pattern data and the clock signal, which have respectively passed through the signal transmission path; and
controlling stop for a write operation by using a confirmation command and a retraining operation by using a retraining command on the memory device based on the information.

17. The method of claim 16, further comprising
transmitting a check command to control the check operation to the memory device.

18. The method of claim 16, further comprising
requesting the information from the memory device,
wherein the receiving of the information from the memory device is performed in response to the requesting.

19. The method of claim 16, further comprising
transmitting a status read signal to the memory device,
wherein the information includes status information of the memory device.

20. The method of claim 16, wherein the pattern data is transmitted to memory device together with write data for the write operation.

* * * * *